US011804984B2

(12) United States Patent
Srivatsan et al.

(10) Patent No.: US 11,804,984 B2
(45) Date of Patent: Oct. 31, 2023

(54) INTELLIGENT AND DYNAMIC OVERLAY TUNNEL FORMATION VIA AUTOMATIC DISCOVERY OF CITRIVITY/SDWAN PEER IN THE DATAPATH IN A PURE PLUG AND PLAY ENVIRONMENT WITH ZERO NETWORKING CONFIGURATION

(71) Applicant: Citrix Systems, Inc., Fort Lauderdale, FL (US)

(72) Inventors: Karthick Srivatsan, Bengaluru (IN); Chaitra Maraliga Ramaiah, Bengaluru (IN); Anand Medikeri, Bengaluru (IN); Rajnesh Raturi, Bengaluru (IN); Moorthi Subramaniyan, Bengaluru (IN); Sandeep Manohar Nirikhi, Bengaluru (IN)

(*) Notice: Subject to any disclaimer, the term of this patent is extended or adjusted under 35 U.S.C. 154(b) by 0 days.

(21) Appl. No.: 17/323,569

(22) Filed: May 18, 2021

(65) Prior Publication Data

US 2021/0281444 A1     Sep. 9, 2021

Related U.S. Application Data

(63) Continuation of application No. 16/232,451, filed on Dec. 26, 2018, now Pat. No. 11,044,117.

(51) Int. Cl.
*H04L 12/46* (2006.01)
*H04L 9/06* (2006.01)
(Continued)

(52) U.S. Cl.
CPC ........ *H04L 12/4633* (2013.01); *H04L 9/0643* (2013.01); *H04L 12/4641* (2013.01);
(Continued)

(58) Field of Classification Search
CPC ............... H04L 9/0643; H04L 45/7453; H04L 12/4641; H04L 45/64; H04L 45/72; H04L 63/0272
See application file for complete search history.

(56) References Cited

U.S. PATENT DOCUMENTS 11,044,117 B2 * 6/2021 Srivatsan ............. H04L 67/288
2006/0034288 A1   2/2006 Lataretu
(Continued)

OTHER PUBLICATIONS

Extended European Search Report on EP 19216634.6, dated Apr. 20, 2020.
(Continued)

*Primary Examiner* — Derrick V Rose

(57) ABSTRACT

Described embodiments provide systems and methods of forming overlay tunnels for delivery of data between networked devices. A first intermediary device may transmit, responsive to a connection request from a client, a request having a source IP address corresponding to a first virtual IP address of the first device and a first payload including first security hash information to be processed by a second intermediary device. The first device may receive, from the second intermediary device, a response. The response may have a source IP address corresponding to the IP address of the server and a second payload including a virtual IP address of the second device, responsive to second security hash information corresponding to the first security hash information. The first device may establish an overlay tunnel using the first virtual IP address and the second virtual IP address for communicating data between the client and the server.

18 Claims, 9 Drawing Sheets

(51) Int. Cl.
   *H04L 45/02* (2022.01)
   *H04L 45/64* (2022.01)
   *H04L 45/00* (2022.01)
   *H04L 45/7453* (2022.01)

(52) U.S. Cl.
   CPC .............. *H04L 45/02* (2013.01); *H04L 45/64* (2013.01); *H04L 45/66* (2013.01); *H04L 45/7453* (2013.01)

(56) References Cited

U.S. PATENT DOCUMENTS

| | | |
|---|---|---|
| 2012/0281708 A1 | 11/2012 | Chauhan et al. |
| 2015/0063364 A1* | 3/2015 | Thakkar .............. H04L 45/7453 370/401 |
| 2015/0124828 A1 | 5/2015 | CJ et al. |
| 2016/0299775 A1 | 10/2016 | Madapurath et al. |
| 2019/0273719 A1* | 9/2019 | Parekh ................... H04L 45/72 |
| 2020/0059459 A1* | 2/2020 | Abraham ............ H04L 12/4641 |
| 2022/0078090 A1* | 3/2022 | Sinha ................... H04L 41/147 |

OTHER PUBLICATIONS

Non-Final Office Action on U.S. Appl. No. 16/232,451 dated May 21, 2020.
Notice of Allowance on U.S. Appl. No. 16/232,451 dated Feb. 22, 2021.

\* cited by examiner

INTELLIGENT AND DYNAMIC OVERLAY TUNNEL FORMATION VIA AUTOMATIC DISCOVERY OF CITRIVITY/SDWAN PEER IN THE DATAPATH IN A PURE PLUG AND PLAY ENVIRONMENT WITH ZERO NETWORKING CONFIGURATION

CROSS-REFERENCE TO RELATED APPLICATION

This application is a continuation of, and claims priority to and the benefit of, U.S. patent application Ser. No. 16/232,451, titled "INTELLIGENT AND DYNAMIC OVERLAY TUNNEL FORMATION VIA AUTOMATIC DISCOVERY OF CITRIVITY/SDWAN PEER IN THE DATAPATH IN A PURE PLUG AND PLAY ENVIRONMENT WITH ZERO NETWORKING CONFIGURATION," and filed on Dec. 26, 2018, the contents of all of which are hereby incorporated herein by reference in its entirety for all purposes.

FIELD OF THE DISCLOSURE

The present application generally relates to communicating network packets, including but not limited to systems and methods of forming overlay tunnels.

BACKGROUND

A network device may select a communication path to send a packet to another network device for accessing resources for an application. Establishing such communication paths, however, may depend on various factors, such a configuration and a type of each network device. These factors may constrain the ability of the network devices to initiate communication paths, thereby inhibiting the capability of network devices to successfully exchange data.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

A client may communicate with a server through one or more intermediary devices in a network (e.g., a software-defined wide-area network (SD-WAN)) to access application resources hosted on the server. The intermediary devices (also referred herein as middle boxes) deployed between the client and the server may select a communication path through the network. Certain clients may lack or may have limited capabilities to handle communications with the server through the network, such as a single-board computer, a laptop, or a tablet. These clients may be multi-homed devices with network interfaces various types of communications, such as wireless local area networks, wired ethernet, digital subscriber line (DSL), or network adapters (e.g., dongles). While the connection of such clients may widen the usage domain and applicability of these networks, such clients may be exposed to additional security risks and may be limited in communication capabilities. For example, without additional configurations, communications between the client and the server may be exposed to potentially malicious third-parties. Furthermore, the clients may not be able to fully access resources from the server via the network. Conversely, intermediary device may also lack hardware or software configuration specific for such clients. Without any additional configuration on the intermediary devices, clients may face difficulty in accessing resources hosted on servers via the network through the intermediary devices. For example, the client may be connected by the intermediary device with a server via a communication path with a data rate well over the capacity of the client.

To address the technical challenges arising in such networks, the intermediary devices may provide an overlay tunnel between a client and a server over the network, without any additional, specialized hardware or software configuration on the client. The intermediary devices may be deployed in a data path of the network between the client and the server, with one on the client-side and another on the server-side. Each intermediary device of the network may be symmetric, with same or similar bandwidth and data rate capabilities (e.g., within 10-15%). The client-side intermediary device may be assigned the same network address (e.g., Internet Protocol (IP) address) as the client. Conversely, the server-side intermediary device may be assigned the same network address as the server. The client-side intermediary device and the server-side intermediary device may establish the overlay tunnel over the network to facilitate communications between the client and the server. The overlay tunnel created by the intermediary may be registered with a set source port number (e.g., "5555") and a set destination port number (e.g., "5555").

In establishing communications between the client and the server, the client-side intermediary device may receive a connection request from the client to connect with the server. As the client-side intermediary device may be on the same data path, the client-side intermediary device may intercept the connection request, prior to traveling down the data path in the network. Using the connection request, the client-side intermediary device may generate a request to find a server-side intermediary device through which to establish communications. In setting the header of the request, the client-side intermediary device may change a source address from the network address of the client to the network address of the client-side intermediary device (e.g., a virtual IP address). Furthermore, the client-side intermediary device may set a source port number to the set number for the overlay tunnel. The client-side intermediary device may also generate a payload data with security hash information based on the header of the connection request with the set source port number. The security hash information may include a hash input for a hash function, may be used to validate or authenticate the server-side intermediary device to initiate establishment of communications with the client-side intermediary device. Once generated, the client-side intermediary device may transmit the request via the network to the server corresponding to the initial destination of the connection request.

The server-side intermediary device may in turn receive the request, as the server-side intermediary device may be on the same data path to the server thereby routing the request to the server-side intermediary device via network address translation. The server-side intermediary device may parse the header of the request to identify the destination port number as referencing the set number. In addition, the server-side intermediary device may also process the payload the request to calculate a hash value using the security hash information. The security hash information may include the hash input generated by the client-side intermediary to authenticate the server-side intermediary device to initiate establishment of communications with the client-side intermediary device. The server-side intermediary device may calculate a hash value from the request, or in particular, the header of the request. With the calculation of the hash values, the server-side intermediary device may compare the two hash values. If the hash values match, the server-side intermediary device may generate a response to indicate to the client-side intermediary device to initiate establishment over an overlay connection. In the payload of the response, the server-side intermediary device may insert a network address (e.g., a virtual IP address) of the server-side intermediary device for the destination of the overlay tunnel to be established. In the header of the response, the server-side intermediary device may also set the source network address of the response to the destination network address from the request. The setting of the source network address of the response to the destination network address from the request may ensure that the packet can be retained in network address translation and not dropped in transit to the client-side appliance. When complete, the server-side intermediary device may send back the request via the network to the client-side intermediary device.

With the receipt of the request, the client-side intermediary device may parse the request to identify the network address of the server-side intermediary device included in the payload. Using the network address of the server-side intermediary device and the network address of the client-side intermediary device, the client-side intermediary device or the server-side intermediary device may establish the overlay tunnel through the network. The overlay tunnel may have a source address referencing the virtual network address of the client-side intermediary device and a destination address referencing the virtual network address of the server-side intermediary device. In addition, the overlay tunnel may be of a network stack layer different from the initial request from the client. Once established, the client and the server may exchange data packets through the overlay tunnel. The data packet may be encapsulated by a sender intermediary device (e.g., client-side or server-side) for transmission over the overlay tunnel. To encapsulate, the sender intermediary device may identify a data packet received from the client or the server. The sender intermediary device may then include or incorporate the data packet into another data packet of a network stack layer different from the original network stack layer of the data packet received form the client or server to send over the overlay tunnel. Conversely, the data packet may be decapsulated by a recipient intermediary device (e.g., client-side or server-side) for processing by the recipient device (e.g., the client or the server). To decapsulate, the recipient intermediary device may identify the data packet received from the sender intermediary device. The recipient intermediary device may then unpack or recover the original data packet from the data packet received via the overlay tunnel, and may send the original packet to be processed by the recipient device.

Subsequently, if the network addresses of the packets exchanged via the overlay tunnel changes, the client-side intermediary device and another server-side intermediary device may repeat the same functionality. The client-side intermediary device may send another request via the network to the server corresponding to the original destination of the connection request from the client. Residing along the data path, the other server-side intermediary device may receive the request. The server-side intermediary device may in response generate a response with a new network address to send to the client-side intermediary device. The new virtual network address may correspond to the server-side intermediary device (e.g., a virtual IP or MAC address). Upon receipt, the client-side intermediary device may update the overlay tunnel using the new network address referencing the new server-side intermediary device. In this manner, the network may be used to communicate between the client and the server through the intermediary devices without any additional configuration on the client, thereby saving hardware and software complexity.

In one aspect, this disclosure is directed to a system. The system may include a first network device. The first network device may be intermediary to a client and a server. The first network device may transmit, responsive to a connection request from the client to establish a connection between the client and the server, a request a second network device intermediary to the client and the server. The request may have a first source IP address corresponding to a virtual IP address of the first network device, a first destination IP address corresponding to an IP address of the server, and a first payload including first security hash information to be processed by the second network device to which the first network device is to discover to establish an overlay tunnel. The first network device may receive, from the second network device, a response to the request, responsive to second security hash information corresponding to the first security hash information included in the first payload. The response may have a second source IP address corresponding to the IP address of the server, a second destination IP address corresponding to an IP address of the client, and a second payload including a virtual IP address of the second network device. The first network device may establish, responsive to the receipt of the response from the second network device indicating that the second security hash information corresponds to the first security hash information, an overlay tunnel between the first network device and the second network device using the virtual IP address of the first network device and the virtual IP address of the second network device. The first network device may direct data from the client to the overlay tunnel established between the first network device and the second network device to transmit to the server.

In some embodiments, the first network device may receive the connection request from the client. The connection request may have a third source IP address corresponding to the IP address of the client and a third destination IP address corresponding to the IP address of the server to which the client is requested to establish the connection between the client and the server. In some embodiments, the second network device may receive the request. The second network device may determine that the destination port number of the request matches the predetermined value. The second network device may process the first payload of the request responsive to determining that the destination port number of the request matches the predetermined value. In some embodiments, the second network device may compute a secure hash using a payload of the connection request.

In some embodiments, the first network device may parse the payload of the response to identify the virtual IP address of the second network device. In some embodiments, the first network device may determine that the second security hash information included in the second payload of the response satisfies the first security hash information included in the request. In some embodiments, the first network device may encapsulate the data prior to transmission of the data from the client to the server via the overlay tunnel. In some embodiments, the second network device may transmit, via a network supporting the overlay tunnel, a request to update a destination IP address of the overlay tunnel to a second virtual IP address.

In some embodiments, the first network device may receive, from at least one of the second network device and a third network device, a request to update a destination IP address of the overlay tunnel to a second virtual IP address. The first network device may change, responsive to the receipt of the request to update, the destination IP address of the overlay tunnel to the second virtual IP address. In some embodiments, the first network device may encapsulate the data from the client for transmission of the data to the server via the overlay tunnel, a third destination IP address of the encapsulated data identifying the second virtual IP address.

In another aspect, this disclosure is directed to a method of forming overlay tunnels for delivery of data between networked devices. A first network device intermediary to a client and a server may transmit, responsive to a connection request from the client to establish a connection between the client and the server, a request a second network device intermediary to the client and the server. The request may have a first source IP address corresponding to a virtual IP address of the first network device, a first destination IP address corresponding to an IP address of the server, and a first payload including first security hash information to be processed by the second network device to which the first network device is to discover to establish an overlay tunnel. The first network device may receive, from the second network device, a response to the request, responsive to second security hash information corresponding to the first security hash information included in the first payload. The response may have a second source IP address corresponding to the IP address of the server, a second destination IP address corresponding to an IP address of the client, and a second payload including a virtual IP address of the second network device. The first network device may establish, responsive to receiving the response from the second network device indicating that the second security hash information corresponds to the first security hash information, an overlay tunnel between the first network device and the second network device using the virtual IP address of the first network device and the virtual IP address of the second network device. The first network device may direct data from the client to the overlay tunnel established between the first network device and the second network device to send to the server.

In some embodiments, the first network device may receive the connection request from the client. The connection request may have a third source IP address corresponding to the IP address of the client and a third destination IP address corresponding to the IP address of the server to which the client is requested to establish the connection between the client and the server. In some embodiments, the second network device may receive the request. The second network device may determine that the destination port number of the request matches the predetermined value. The second network device may process the first payload of the request responsive to determining that the destination port number of the request matches the predetermined value. In some embodiments, the second network device may compute a secure hash using a payload of the connection request.

In some embodiments, the second network device may transmit, via a network supporting the overlay tunnel, a request to update a destination IP address of the overlay tunnel to a second virtual IP address. In some embodiments, the first network device may parse the payload of the response to identify the virtual IP address of the second network device. In some embodiments, the first network device may determine that the second security hash information included in the second payload of the response satisfies the first security hash information included in the request. In some embodiments, the first network device may encapsulate the data prior to transmission of the data from the client to the server via the overlay tunnel.

In some embodiments, the first network device may receive, from at least one of the second network device and a third network device, a request to update a destination IP address of the overlay tunnel to a second virtual IP address. The first network device may change, responsive to the receipt of the request to update, the destination IP address of the overlay tunnel to the second virtual IP address.

In another aspect, this disclosure is directed to a non-transitory computer readable medium storing program instructions. The program instructions may cause one or more processors to transmit, from a first network device intermediary to a client and a server responsive to a connection request from the client to establish a connection between the client and the server, a request to a second network device intermediary to the client and the server. The request may have a first source IP address corresponding to a virtual IP address of the first network device, a first destination IP address corresponding to an IP address of the server, and a first payload including first security hash information to be processed by the second network device to which the first network device is to discover to establish an overlay tunnel. The program instructions may cause the one or more processors to receive, from the second network device, a response to the request, responsive to second security hash information corresponding to the first security hash information included in the first payload. The response may have a second source IP address corresponding to the IP address of the server, a second destination IP address corresponding to an IP address of the client, and a second payload including a virtual IP address of the second network device. The program instructions may cause the one or more processors to establish, responsive to the receipt of the response from the second network device indicating that the second security hash information corresponds to the first security hash information, an overlay tunnel between the first network device and the second network device using the virtual IP address of the first network device and the virtual IP address of the second network device. The program instructions may cause the one or more processors to direct data from the client to overlay tunnel established between the first network device and the second network device to send to the server.

In some embodiments, the first network device may receive the connection request from the client. The connection request may have a third source IP address corresponding to the IP address of the client and a third destination IP address corresponding to the IP address of the server to which the client is requested to establish the connection between the client and the server.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
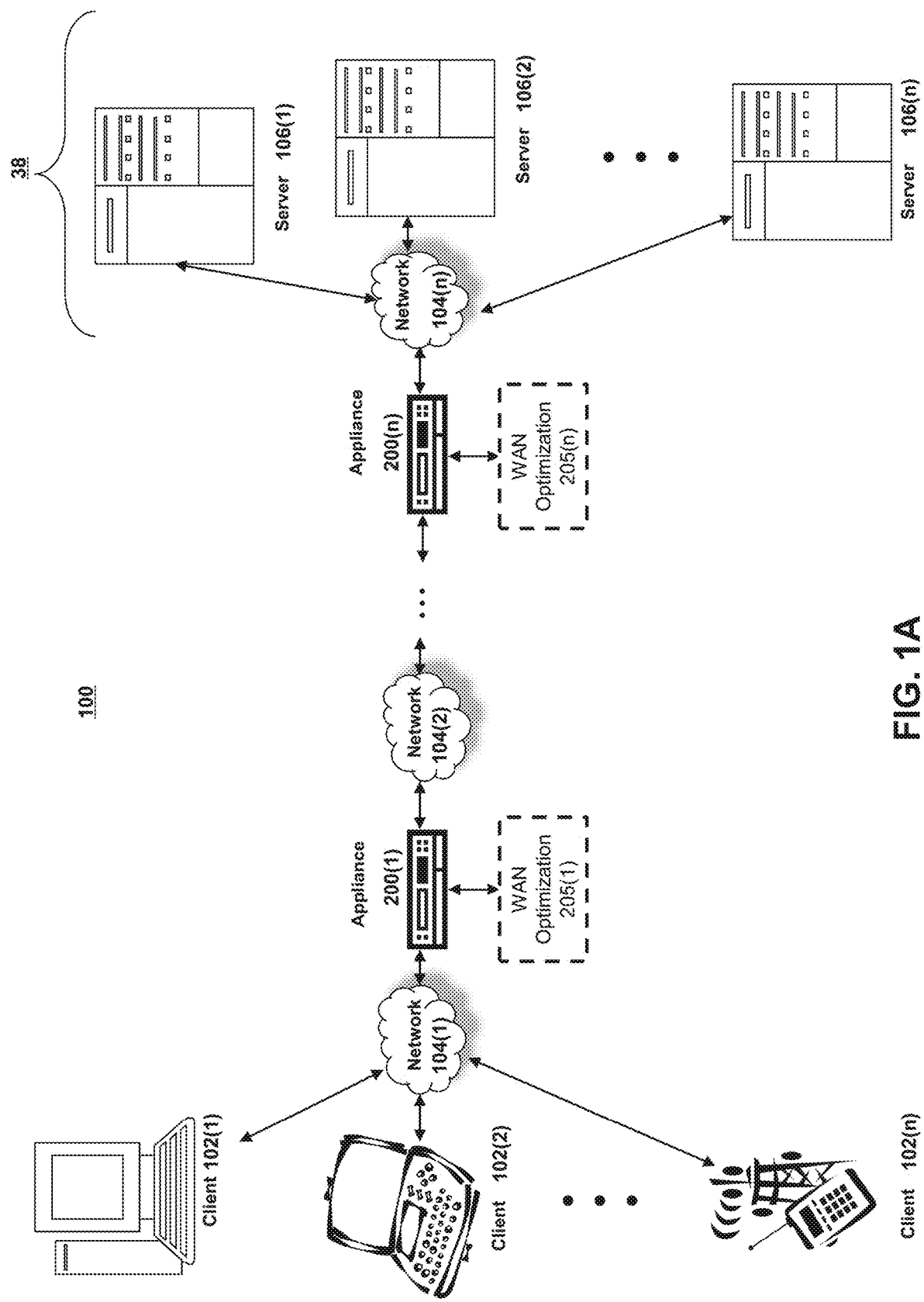
FIG. 1A is a block diagram of a network computing system, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:
- Section A describes a network environment and computing environment which may be useful for practicing embodiments described herein;
- Section B describes embodiments of systems and methods for delivering a computing environment to a remote user;
- Section C describes embodiments of systems and methods for virtualizing an application delivery controller;
- Section D describes embodiments of systems and methods for providing a clustered appliance architecture environment; and
- Section E describes embodiments of systems and methods of forming overlay tunnels for delivery of data between networked devices.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, FL.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, FL.

Figure 1B:
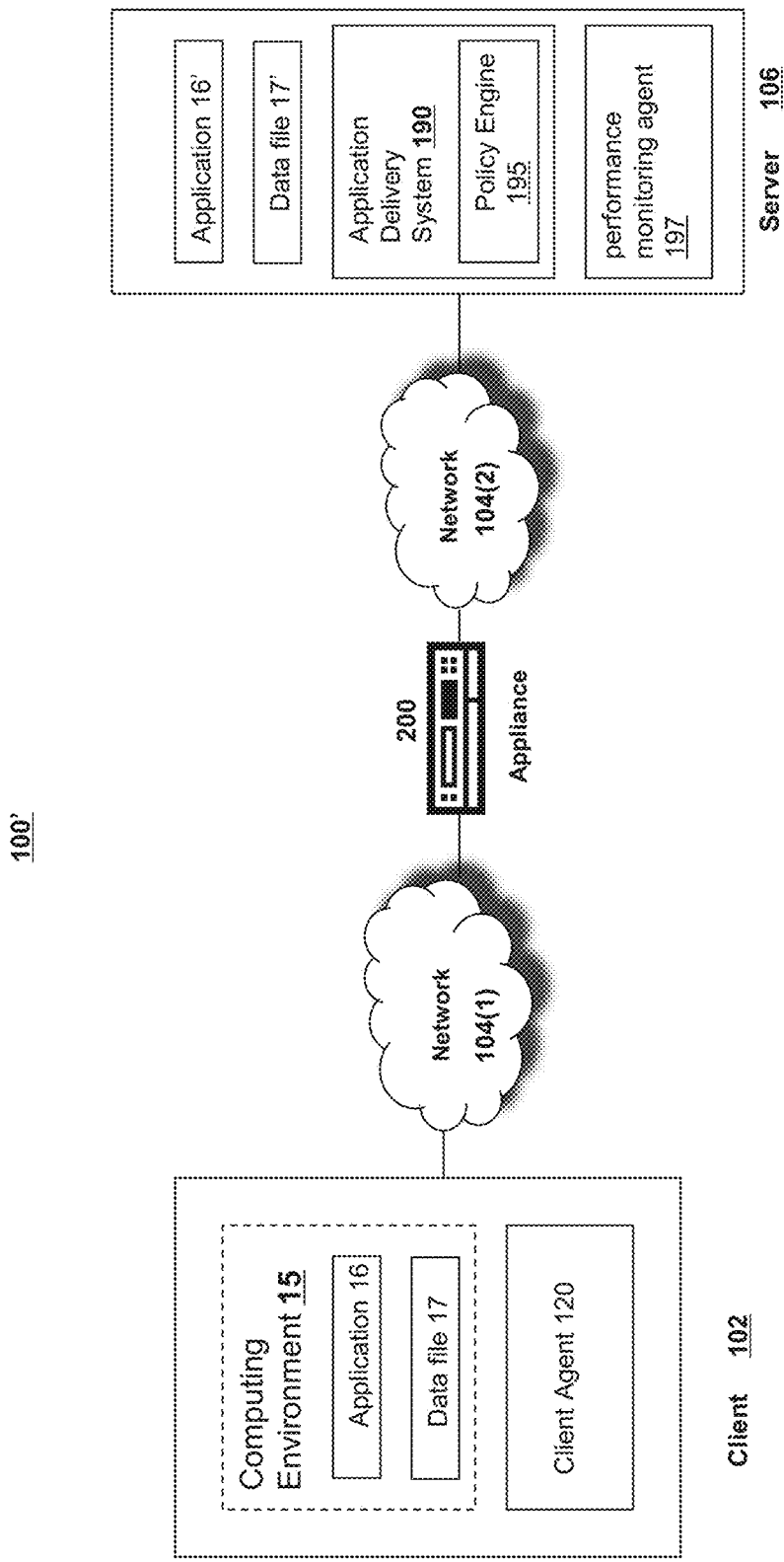
FIG. 1B is a block diagram of a network computing system for delivering a computing environment from a server to a client via an appliance, in accordance with an illustrative embodiment.

Referring to FIG. 1B, an example network environment 100' for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, FL. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, FL.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
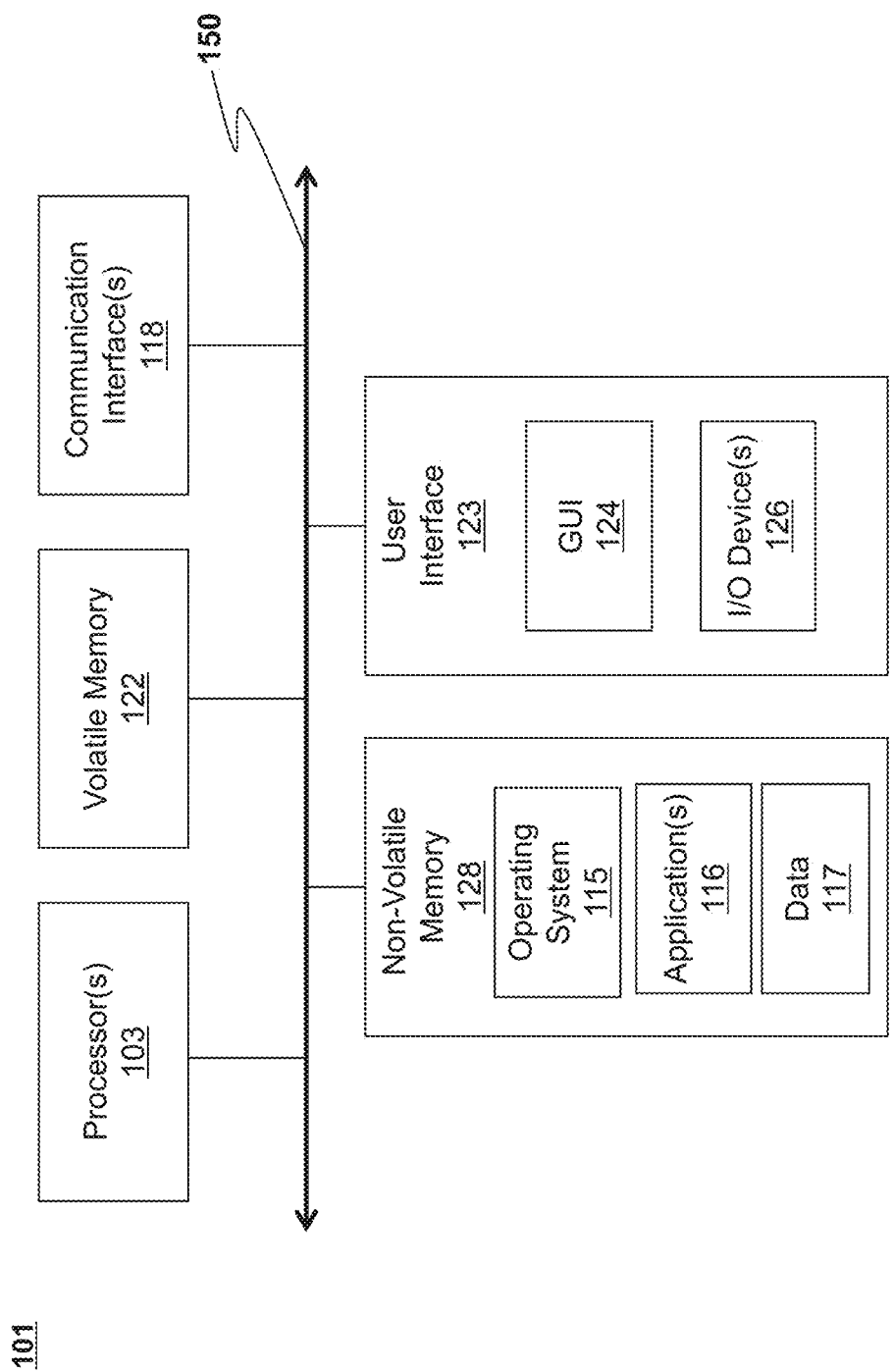
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, FL, the teachings of which are hereby incorporated herein by reference.

B. Appliance Architecture

Figure 2:
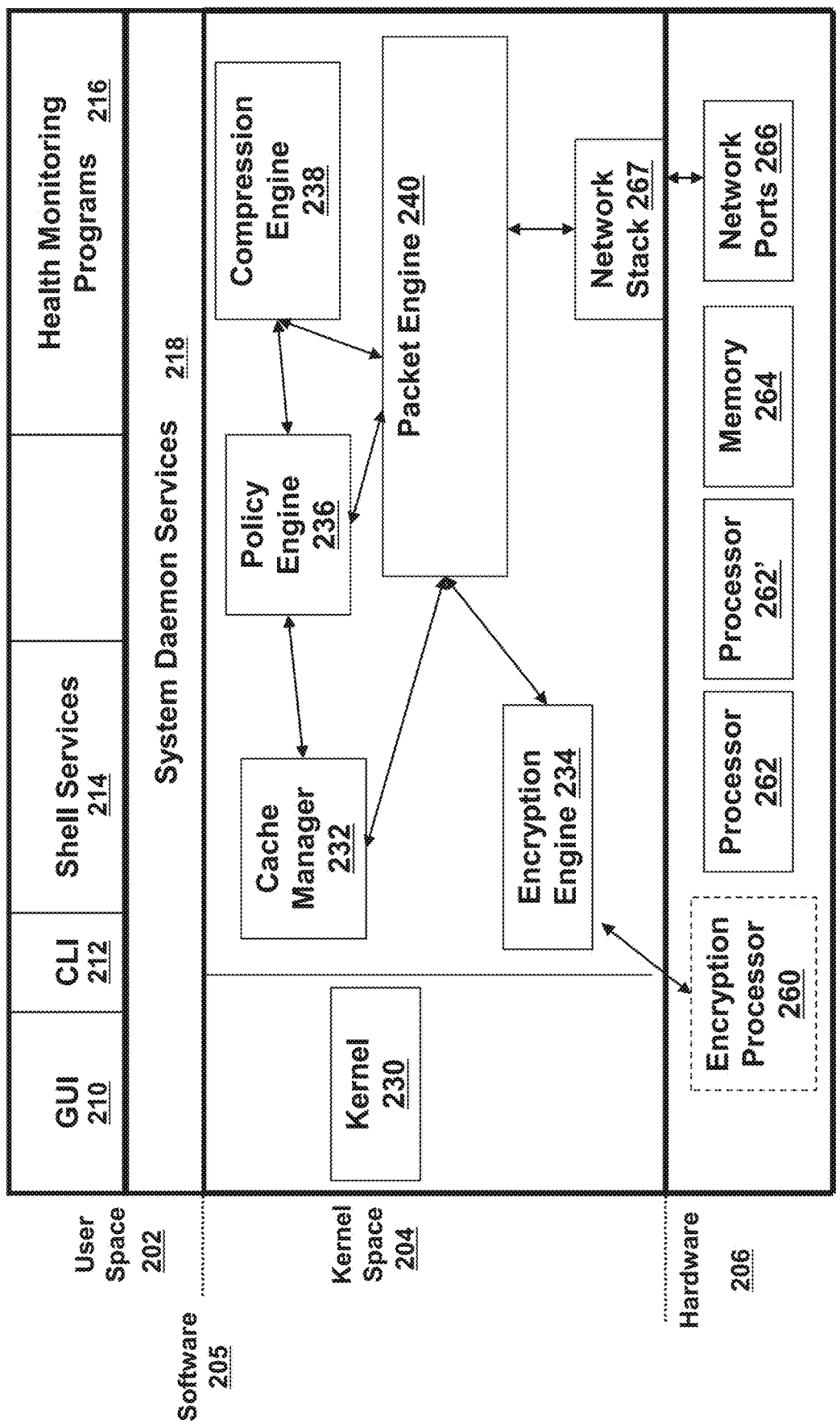
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, FL. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, FL, the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, FL.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
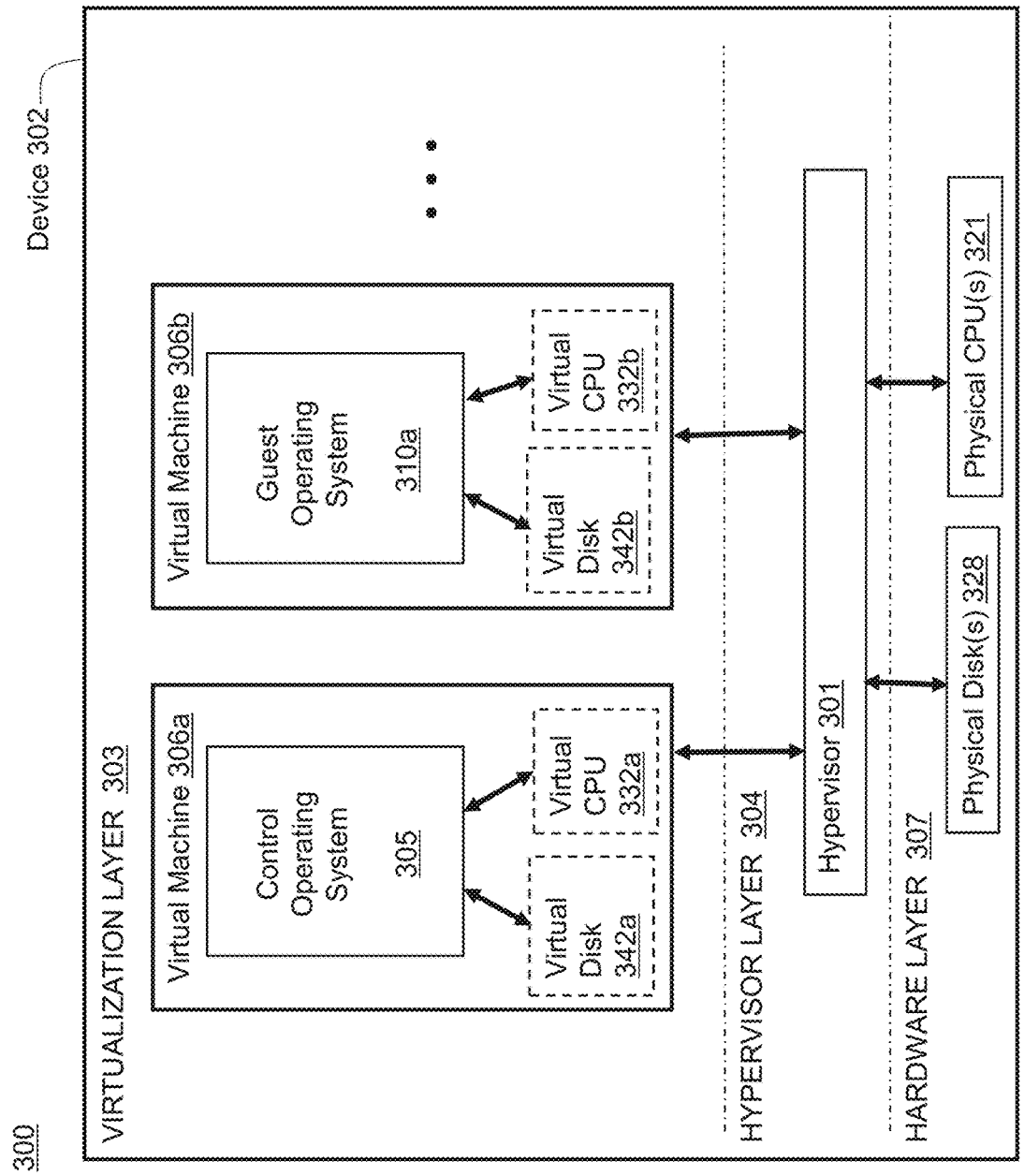
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, FL, the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, FL, the teachings of which are hereby incorporated herein by reference.

D. Systems and Methods for Providing a Distributed Cluster Architecture

Figure 4:
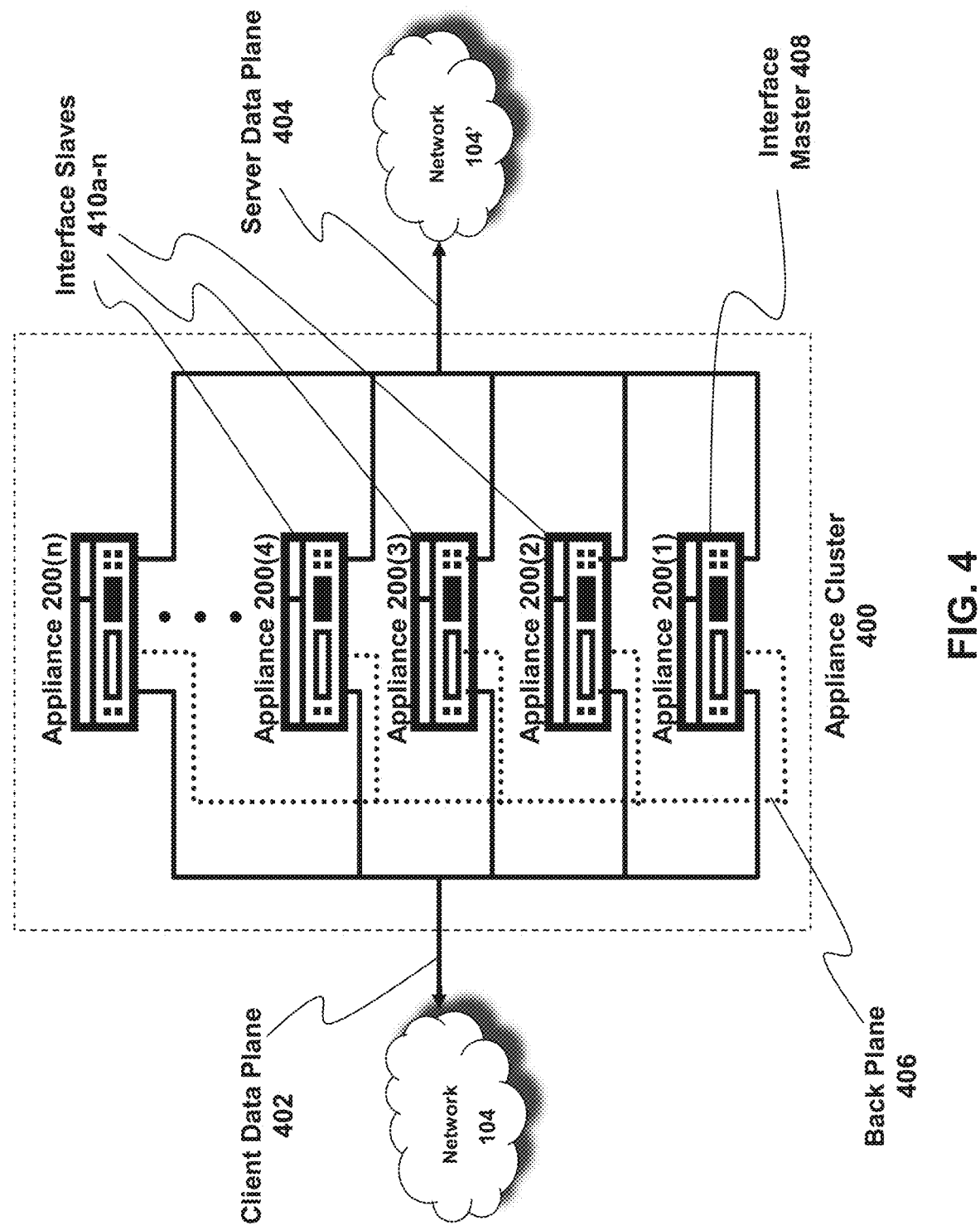
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205. The cluster 400 may include an interface master 408 and one or more interface slaves 410a-n. The interface master 408 may distribute traffic across the appliances 200 including the interface master 408 and the one or more interface slaves 410a-n of the cluster 400.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similar to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or backplane 406. Backplane 406 may enable inter-node or inter-appliance control and configuration messages, for inter-node forwarding of traffic, and/or for communicating configuration and control traffic from an administrator or user to cluster 400. In some embodiments, backplane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, FL, the teachings of which are hereby incorporated herein by reference.

Figure 5:
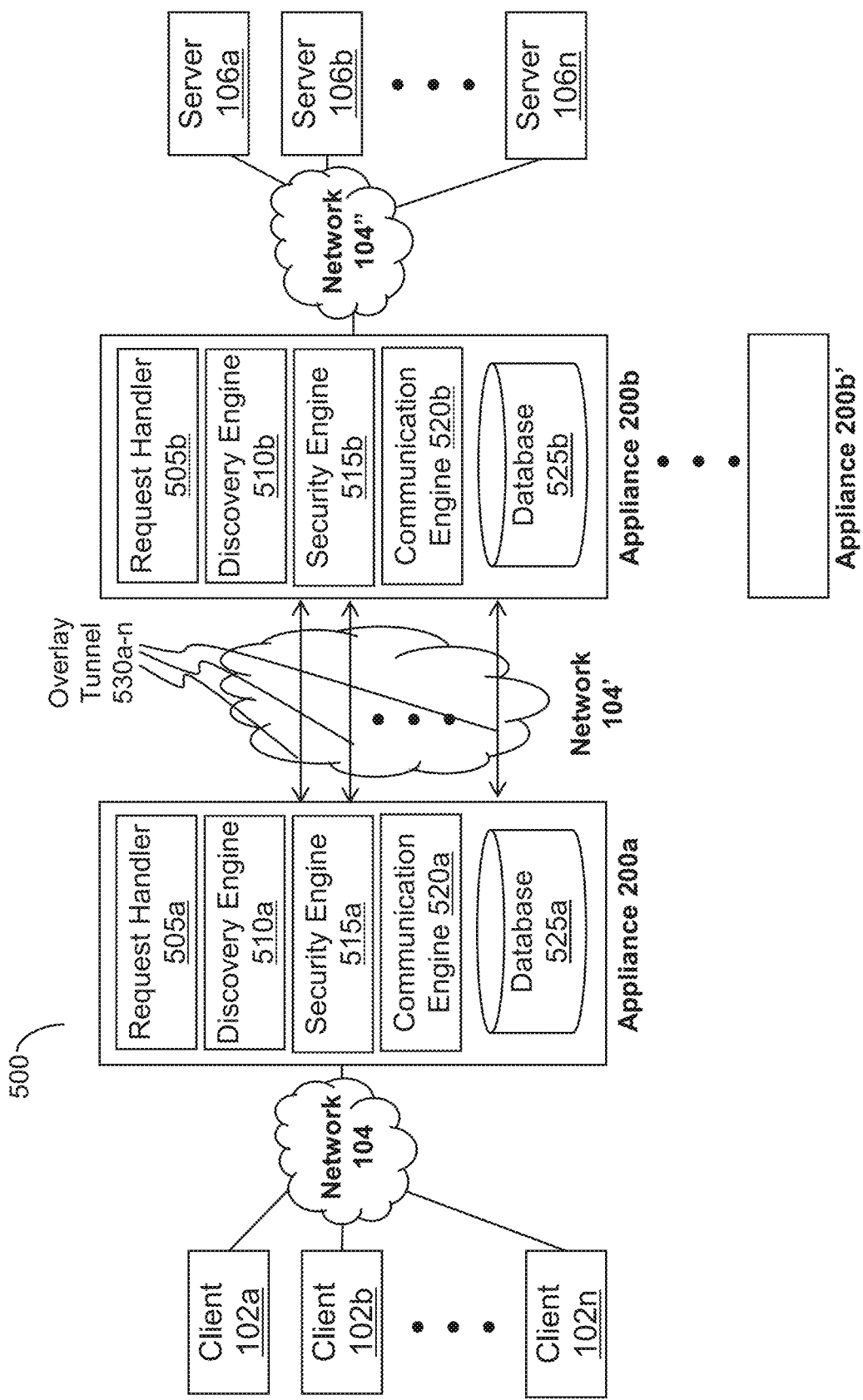
FIG. 5 is a block diagram for a system for forming overlay tunnels for delivery of data between devices in networked environments.

E. Systems and Methods for Forming Overlay Tunnels for Delivery of Data Between Networked Devices Referring now to FIG. 5, depicted is a system 500 for forming overlay tunnels. In overview, the system 500 may include one or more clients 102a-n (hereinafter generally referred to as clients 102), one or more servers 106a-n (hereinafter generally referred to as servers 106), and one or more appliances 200a, 200b (e.g., intermediary devices, network devices, middle box devices, proxy devices) deployed between the clients 102 and the servers 106, among others. The one or more clients 102 and at least one appliance 200a (e.g., a client-side appliance 200a) may be in communication with one another via a client-side network 104. In some embodiments, the one or more clients 102 may reside at a branch office and the client-side network 104 may be a private network (e.g., a wired ethernet connection, a local area network (LAN), or a wide area network (WAN)) between the clients 102 and the client-side appliances 200a. At least one appliance 200a (e.g., the client-side appliance 200a) and at least one another appliance 200b (e.g., a server-side appliance 200b) may be in communication with one another via an intermediary network 104'. In some embodiments, the intermediary network 104' may be a public network (e.g., the Internet) between the client-side appliances 200a and the server-side appliances 200b. Each appliance 200a and 200b may include at least one request handler 505a or 505b, at least one discovery engine 510a or 510b, at least one security engine 515a or 515b, at least one communication engine 520a or 520b, and at least one database 525a or 525b, among others. The client-side appliance 200a and the server-side appliance 200b may be connected via one or more overlay tunnels 530a-n through the intermediary network 104'. The one or more servers 106 and at least one appliance 200b (e.g., the server-side appliance 200b) may be in communication with one another via a server-side network 104". In some embodiments, the servers 106 may reside in a data center, and the server-side network 104" may be a private network (e.g., a direct ethernet connection, a local area network (LAN), or a wide area network (WAN)) or a public network (e.g., the Internet) between the server-side appliances 200b and the servers 106. An appliance 200a-n can include or correspond to any type or form of intermediary device, network device, middle box device and/or proxy device, such as but not limited to a Netscaler device, SD-WAN device, and so on.

The systems and methods of the present solution may be implemented in any type and form of device, including clients, servers and/or appliances 200a and 200b. As referenced herein, a "server" may sometimes refer to any device in a client-server relationship, e.g., an appliance 200a and 200b in a handshake with a client device 102. The present systems and methods may be implemented in any intermediary device or gateway, such as any embodiments of the appliance or devices 200a and 200b described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments described herein.

In further detail, to access resources for an application, the client 102 running the application may send a connection request to the server 106. The application may be a web-based application (e.g., a word processor, a spreadsheet editor, a database manager, or a video game), and may have operations distributed between the client 102 and the server 106. The client 102 may generate the connection request concurrent to running the application. The connection request may be any communications protocol at any network layer stack, such as an application layer protocol (e.g., Hypertext Transfer Protocol (HTTP) or Transport Layer Security (TLS)), a transport layer protocol (e.g., Transmission Control Protocol (TCP), User Datagram Protocol (UDP), or Reliable Data Protocol (RDP)), or an internet layer (e.g., Internet Protocol (IP) or Internet Protocol Security (IPsec)).

The connection request generated and transmitted by the client 102 may have a header and a payload. The header of the connection request may include a source address, a source port number, a destination address, and a destination port number, among others. The source address may be set to an actual network address (e.g., a IP address or Media Access Control (MAC) address) referencing the client 102. In some embodiments, the actual network address may correspond to a public IP address or a public MAC address. In some embodiments, the actual network address may correspond to a private IP address or a private MAC address used in the network 104, 104', or 104". The source port number may be set to a port of the client 102 from which the connection request is sent. The source port number may be set to an arbitrary or random value, or may be specified by the application running on the client 102. The destination address may be set to an actual network address (e.g., IP address or MAC address) referencing the server 106. The destination port number may be set to a port of the server 106 on which the connection request is to be received. The destination port number may be set to an arbitrary or random value, or may be specified by the application running on the client 102. The payload may include data for the application running on the client 102. For example, the data for the application running on the client 102 included in the payload may include an operation or a reference to a particular resource hosted on the server 106. Once sent from the client 102, the connection request may be forwarded toward the server 106 via the network 104, 104', and 104".

The request handler 505a executing on the client-side appliance 200a may receive the connection request from the client 102. In some embodiments, the request handler 505a may intercept the connection request transmitted from the client 102. The client-side appliance 200a may reside on a communication data path between the client 102 and the server 106. In some embodiments, the client-side appliance 200a may reside on the communication data path between the client 102 and the network 104'. As such, the network 104 may route communications destined to the server 106 from the client 102 to the client-side appliance 200a. For example, the client 102 may be plugged into the client-side appliance 200a using a physical connection, thereby allowing plug-and-play functionality between the client 102 and the client-side appliance 200a. The client-side appliance 200a may also be assigned to a set of network addresses for which communications from the client 102 are to be routed to the client-side appliance 200a. In this manner, any communications originating out from the client 102 may pass through the client-side appliance 200a. In some embodiments, the request handler 505a may intercept or identify the connection request passing through the client-side appliance 200a from the client 102. With the identification of the connection request, the request handler 505a may store a copy of the connection request for additional parsing. Residing on the same communication data path as the client 102 and the server 106, the request handler 505a may permit the connection request to transit over the client-side appliance 200a with minimal delay. In some embodiments, the request handler 505a may forward or pass the communication request from the client 102 into the network 104'.

The request handler 505b executing on the server-side appliance 200b may receive the connection request originating from the client 102 and passing through the client-side appliance 200a. In some embodiments, the request handler 505b may intercept the connection request passing through the client-side appliance 200a. The server-side appliance 200b may reside on a communication path between the client 102 and the server 106. In some embodiments, the server-side appliance 200b may reside on the communication path between the network 104' and the server 106. The network 104' may route communications destined to the server 106 to the server-side appliance 200b. For example, the server-side appliance 200b may be assigned to a set of network addresses for which communications destined to the server 106. In this manner, any communications with the destination set to the server 106 may be routed by the network 104' to pass through the server-side appliance 200b. In some embodiments, the request handler 505b may identify the connection request passing through the server-side appliance 200b destined to the server 106. In some embodiments, the request handler 505b may forward or pass the communication request from the network 104' to the server 106.

The discovery engine 510a executing on the client-side appliance 200a may generate a discover request (sometimes referred herein as a "request") to establish a connection between the client 102 and the server 106, responsive to the receipt of the connection request from the client 102. The discover request may be to find another appliance (e.g., the server-side appliance 200b) with which to facilitate the establishment of the connection between the client 102 and the server 106. In some embodiments, the discovery engine 510a may create a copy of the connection request received from the client 102 to generate the discover request, prior to forwarding the connection request via the network 104'. In some embodiments, the discovery engine 510a may parse the header of the connection request received from the client 102 in generating the discover request. In particular, the discovery engine 510a may parse the header of the connection request to include, in the discover request, information, such as the source IP address, the destination IP address, among others, which may be identified from the header of the connection request. The discover request may be generated by the discovery engine 510a in accordance to any communications protocol at any network layer stack, such as an application layer protocol (e.g., Hypertext Transfer Protocol (HTTP) or Transport Layer Security (TLS)), a transport layer protocol (e.g., Transmission Control Protocol (TCP), User Datagram Protocol (UDP), or Reliable Data Protocol (RDP)), or an internet layer protocol (e.g., Internet Protocol (IP) or Internet Protocol Security (IPsec)), among others. The discover request may include a header and a payload.

Using the header of the connection request, the discovery engine 510a may set one or more values in the header of the discover request to direct the discover request to the server-side appliance 200b. The header of the discover request may include a source address, a source port number, a destination address, and a destination port number, among others. In some embodiments, the discovery engine 510a may parse the header of the connection request received from the client 102 to generate the discover request. The discovery engine 510a may set the source address in the header of the discover request to a virtual network address of the client-side appliance 200a. The virtual network address may be used in an overlay network (e.g., a virtual private network (VPN)) to be established over the network 104'. The virtual network address referencing the client-side appliance 200a over the overlay network may differ from the actual network address referencing the client-side appliance 200a within the network 104'. For example, the source address of the discover request may be set to the virtual IP address or virtual MAC address of the client-side appliance 200a. The virtual network address may differ from the actual virtual network in that the virtual network address may be routed using network address translation (NAT)) for the data prior to transmission to the network device corresponding to the virtual network address. In this case, when communications are exchanged over the overlay network, any packet with a destination address set to the virtual network address referencing the client-side appliance 200a may be seamlessly redirected and routed to the client-side appliance 200a. In some embodiments, the discovery engine 510a may generate or identify the virtual network address for the client-side appliance 200a to include into the header of the discover request. For example, the discovery engine 510a may generate the virtual network address in accordance with the Internet Protocol (e.g., IPv4 or IPv6) to reference the client-side appliance 200a distinct from the actual network address over the network 104'. The discovery engine 510a may set the destination address in the header of the discover request to the network address of the server 106. The actual network address of the server 106 may be, for example, the public IP address of the server 106. In some embodiments, the discovery engine 510a may parse the header of the connection request from the client 102 to identify the actual network address of the server 106 to include into the header of the discover request.

In addition, the discovery engine 510a may set the source port number in the header of the discover request to a value (e.g., "5555"). The value for the source port number may indicate to the recipient device (e.g., server-side appliance 200b) to initiate the overlay network over the network 104' with the client-end appliance 200a. The value for the source port number may be registered, assigned, or otherwise associate with overlay communications over the network 104'. The value for the source port number may be stored and maintained on the database 525a or by another administrative device for the network 104'. The overlay communications may be a peer-to-peer data path defined through the network 104' between the client-side appliance 200a and the server-side appliance 200b as the two network nodes. Furthermore, the discovery engine 510a may set the destination port number in the header of the discover request to a value (e.g., "5555"). For example, when generating the discover request, the discovery engine 510a may establish the destination port number as equal to the value and the source port number as equal to the value. The source port number and the destination port number may be set to any value recognized by the client-side appliance 200a and the server-side appliance 200b as indicating initiation of the establishment of the overlay network on the network 104' and communication over the overlay network. The value for the destination port number may be the same as the value for the source port number. The value for the destination port number may differ from the value for the source port number. In addition, the difference in the values between the destination port number and the source port number may be to distinguish the processing of packets to be sent over the overlay network and packets to be received via the overlay network. The value for the destination port number may indicate to the recipient device (e.g., the server-side appliance 200b) to initiate the overlay network over the network 104' with the client-end appliance 200a. The value for the destination port number may be registered, assigned, or otherwise associate with the overlay communications over the network 104'. The value for the destination port number may be stored and maintained on the database 525a or by another administrative device for the network 104'. Other fields of the header of the discover request may be set to a value to indicate to the recipient device (e.g., server-side appliance 200b) to initiate establishment of the overlay network over the network 104'. Such fields of the header may include flags, options, the source address, and the destination address, among others.

The security engine 515a executing on the client-side appliance 200a may generate the payload of the discover request. The payload may include security hash information to be processed by another network device (e.g., the server-side appliance 200b) in the network 104' to verify for establishing the overlay communications. The security engine 515a may use the header from the connection request modified with the source port number set to the value or the destination port number set to the value in generating the security hash information. In some embodiments, the security engine 515a may parse the connection request from the client 102 to identify the header. The security engine 515a may apply a hash function to the modified header from the connection request to generate the security hash information. The hash function applied by the security engine 515a may include a checksum, a hash-based message authentication code (HMAC), a message-digest algorithm (MD), and a Secure Hash Algorithm (SHA-1, SHA-2, and SHA-3), among others. The security engine 515a may insert or include the generated security hash information into the payload of the discover request. In some embodiments, the security engine 515a may set the payload of the discover request to the security hash information. With the header and the payload of the discover request set, the discovery engine 510a may transmit the discover request via the network 104'.

The discovery engine 510b executing on the server-side appliance 200b may receive the discover request transmitted through the network 104' from the client-side appliance 200a. The server-side appliance 200b may reside on the communication path between the client-side appliance 200a and the server 106. The network 104' may route communications destined to the server 106 to the server-side appliance 200b (e.g., using network address translation). For example, the server-side appliance 200b may be assigned to a set of network addresses for which communications destined to the server 106. As the destination address of the discover request references the server 106, the network 104' may route the discover request to the server-side appliance 200b. Upon receipt of the discover request via the network 104', the discovery engine 510b may parse the discover request to identify the header. In some embodiments, the discovery engine 510b may parse the header to identify the source address, source port number, destination address, and destination port number, among others. The discovery engine 510b may determine whether the source port number of the discover request matches the value (e.g., "5555"). The discovery engine 510*b* may determine whether the destination port number of the discover requests matches the value (e.g., "5555"). When the source port number or the destination port number is determined to not match the value, the discovery engine 510*b* may perform no further action in processing the discovery request.

Otherwise, when the source port number or the destination port number is determined to match the value, the security engine 515*b* executing on the server-side appliance 200*b* may process the payload of the discover request. The security engine 515*b* may also generate security hash information (sometimes herein referred to as a hash key) using the discover request received from the client-side appliance 200*a*. In some embodiments, the generation of the security hash information may be responsive to determining that the source port number or the destination port number matches the value. For example, to save processing resources at the server-side appliance 200*b* each time a request is received, the security engine 515*b* may limit the generation of the security hash information to when one of the port numbers matches the value (e.g., "5555"). In some embodiments, the security engine 515*b* may parse the discover request to identify the header, the payload, or a combination of the header and the payload to use in generating the security hash information. The security engine 515*b* may apply a hash function to the header from the discover request to generate the security hash information. The hash function applied by the security engine 515*b* may include a checksum, a hash-based message authentication code (HMAC), a message-digest algorithm (MD5), and a Secure Hash Algorithm (SHA-1, SHA-2, and SHA-3), among others. The hash function applied by the security engine 515*b* may be the same as the hash function applied by the security engine 515*a*.

With the generation of the security hash information from the discover request, the security engine 515*b* may compare the independently generated security hash information with the security hash information in the payload of the discover request. In some embodiments, the security engine 515*b* may parse the payload of the discover request received from the client-side appliance 200*a* to identify the security hash information. The security hash information from the discover request from the client-side appliance 200*a* may be generated independent of the generation of the security hash information using the discover request from the client 102. In some embodiments, the security engine 515*b* may validate the security hash information from the payload of the discover request from the client-side appliance 200*a* by comparing the security hash information with the security hash information independently generated by the security engine 515*b*. The validation may serve to prevent rogue requests by unauthorized or non-symmetric network devices besides the client-side appliance 200*a* from forming a connection with the server-side appliance 200*b*. Symmetric network devices may have the same or similar configuration, such as bandwidth and data processing rate capabilities. The validation may also function as establishing trusted communications between the client-side appliance 200*a* and the server-side appliance 200*b*.

If the independently generated security hash information is determined not to match or satisfy the security hash information from the payload of the discover request, the discovery engine 510*b* may determine that the discover request from the client-side appliance 200*a* fails to be validated. The discovery engine 510*b* may further determine that the discover request is not associated with the connection request to establish communications between the client 102 and the server 106 when the security hash information do not match. In some embodiments, the discovery engine 510*b* may determine that the discover request received from the client-side appliance 200*a* was not generated or transmitted in connection with or in response to the discover request sent from the client 102 when the security hash information do not match. In some embodiments, the discovery engine 510*b* may also determine that the client-side appliance 200*a* is not an authorized device with which the server-side appliance 200*b* is to establish the overlay network. In some embodiments, the discovery engine 510*b* may not send a response messages to the client-side appliance 200*a* in response to the discover request, when the discover request is determined to not be associated with the discover request.

In some embodiments, the discovery engine 510*b* may transmit a failure response to the client-side appliance 200*a* in response to determining that the discover request fails to be validated. The failure response may be generated in accordance to any communications protocol at any network layer stack. The failure response may include a header and a payload. The header of the failure response may include a source address, a source port number, a destination address, and a destination port number, among others. The discovery engine 510*b* may set the source address of the failure response to the actual network address of the server-side appliance 200*b* (e.g., an IP address of the server-side appliance 200*b*). The discovery engine 510*b* may set the destination address to the actual network address of the client 102. In some embodiments, the discovery engine 510*b* may parse the discover request to identify the header, including the source address set to the virtual network address of the client-side appliance 200*a*, to use in generating the failure response. The discovery engine 510*b* may insert or include an indication that the discover request failed to be validated into the payload of the failure response. The discovery engine 510*b* may send the failure response to the client-side appliance 200*a* via the network 104'.

On the other hand, if the independently generated security hash information is determined to match or satisfy the security hash information from the discover request from the client-side appliance 200*a*, the discovery engine 510*b* may determine that the discover request from the client-side appliance 200*a* is successfully validated. The discovery engine 510*b* may determine that the discover request is associated with the connection request to establish communications between the client 102 and the server 106 when the security hash information match. The discovery engine 510*b* may determine that the discover request received from the client-side appliance 200*a* was generated or transmitted in connection with or in response to the connection request sent from the client 102. In some embodiments, the discovery engine 510*b* may also determine that the client-side appliance 200*a* is an authorized device with which the server-side appliance 200*b* is to establish the overlay network. In some embodiments, the discovery engine 510*b* may save or store the source address from the discover request onto the database 525*b*. The source address of the header in the discover request may include the virtual network address (e.g., the virtual IP address or virtual MAC address) referencing the client-side appliance 200*a*. In some embodiments, the discovery engine 510*b* may save or store the actual network address of the server 106 as associated with the virtual network address of the client-side appliance 200*a* onto the database 525*b*. The association may be to route any communications over the overlay network with the virtual network address referencing the client-side appliance 200a to the server 106. In some embodiments, the discovery engine 510b may store the actual network address of the client 102 from the connection request onto the database 525b. The actual network address of the client 102 may be stored as associated with the virtual network address of the client-side appliance 200a on the database 525b. In some embodiments, the discovery engine 510b may store the original source port number and the destination port number identified from the connection request onto the database 525b. The storage of the original port numbers may be used to associate the connection request to the to-be established overlay network.

The discovery engine 510b may generate a discover response (sometimes herein generally referred as a "response") to transmit to the client-side appliance 200a in response to determining that the discover request is successfully validated. The discover response may be to acknowledge receipt and validation of the discover request, and may indicate that the sender network device (e.g., the server-side appliance 200b) is a symmetric device with the recipient network device (e.g., the client-side appliance 200a). A set of network devices may be symmetric, when the network devices can communicate with each other to establish the overlay tunnel. In addition, the set of symmetric network devices may have the same or similar configuration, such as bandwidth and data processing rate capabilities. In some embodiments, the discovery engine 510b may use the discover request from the client-side appliance 200a to generate the discover response to send to the client-side appliance 200a. The discover response may be generated in accordance to any communications protocol at any network layer stack, such as an application layer protocol (e.g., Hypertext Transfer Protocol (HTTP) or Transport Layer Security (TLS)), a transport layer protocol (e.g., Transmission Control Protocol (TCP), User Datagram Protocol (UDP), or Reliable Data Protocol (RDP)), or an internet layer protocol (e.g., Internet Protocol (IP) or Internet Protocol Security (IPsec)), among others. The discover response may include a header and a payload.

The discovery engine 510b may set one or more values in the header of the discover request to direct the discover response to the client-side appliance 200a. The header may include a source address, a source port number, a destination address, and a destination port number, among others. The discovery engine 510b may set the source address of the header in the discover response to the actual network address of the server-side appliance 200b (e.g., the IP address). In some embodiments, the actual network address of the server-side appliance 200b may be used to refer to the server-side appliance 200b in the network 104'. In some embodiments, the discovery engine 510b may set the destination address of the header in the discover response to the source address from the connection request from the client 102. In some embodiments, the discovery engine 510b may parse the connection request to identify the source address referencing the client 102. In some embodiments, the discovery engine 510b may set the destination of the header in the discover response to the source address from the discover request from the client-side appliance 200a. The source address from the discover request may correspond to a virtual network address of the client-side appliance 200a.

Furthermore, the discovery engine 510b may set the source port number in the header of the discover response to a value (e.g., "5555"). The value for the source port number may indicate to the recipient device (e.g., client-side appliance 200a) to initiate the overlay network over the network 104' with the server-end appliance 200b. In this manner, the setting of the source port number to the value may signal to the client-side appliance 200a that the discover response was received by an appropriate server-side appliance 200b that is configured to establish the overlay network with the client-side appliance 200a. The value for the source port number may be registered, assigned, or otherwise associate with the overlay communications over the network 104'. The value for the source port number may be stored and maintained on the database 525b or by another administrative device for the network 104'. Furthermore, the discovery engine 510b may set the destination port number in the header of the discover response to a value (e.g., "5555"). The value for the destination port number may be the same as the value for the source port number. The value for the destination port number may differ from the value for the source port number. The difference in the values between the destination port number and the source port number may be to distinguish the processing of packets to be sent over the overlay network and packets to be received via the overlay network. In some embodiments, the value used by the discovery engine 510b on the server-side appliance 200b may be the same as the value used by the discovery engine 510a on the client-side appliance 200a. The value for the destination port number may indicate to the recipient device (e.g., the client-side appliance 200a) to initiate the overlay network over the network 104' with the server-end appliance 200b. The value for the destination port number may be registered, assigned, or otherwise associate with the overlay communications over the network 104'. The value for the destination port number may be stored and maintained on the database 525b or by another administrative device for the network 104'. Other fields of the header of the discover response may be set to a value to indicate to the recipient device (e.g., server-side appliance 200a) to initiate establishment of the overlay network over the network 104'. Such fields of the header may include flags, options, the source address, and the destination address, among others.

With the successful validation of the discover request, the security engine 515b may generate new security hash information to include into the payload of the discover response. The security hash information for the discover response may be processed by another network device (e.g., the client-side appliance 200a) in the network 104' to verify for establishing the overlay communications. The security engine 515b may use the header for the discover response in generating the security hash information. The hash function applied by the security engine 515b may include a checksum, a hash-based message authentication code (HMAC), a message-digest algorithm (MD5), and a Secure Hash Algorithm (SHA-1, SHA-2, and SHA-3), among others. The security engine 515b may insert or include the generated security hash information into the payload of the discover response. In some embodiments, the security engine 515b may set the payload of the discover response to the security hash information.

The discovery engine 510b may set the payload of the discover response. The discovery engine 510b may insert or include a virtual network address of the server-side appliance 200b into the payload of the discover response. The virtual network address may be used in the overlay network (e.g., a virtual private network (VPN)) to be established over the network 104', and may reference the server-side appliance 200b. For example, the virtual network address included in the payload of the discover response may be a virtual IP address or virtual MAC address of the server-side appliance 200b. In some embodiments, the discovery engine 510b may generate or identify the virtual network address for the server-side appliance 200b to include into the payload of the discover response. In some embodiments, the discovery engine 510b may generate the virtual network address referencing the server-side appliance 200b, responsive to determining that the discover request is associated with the discover request. With the generation of the discover response, the discovery engine 510b may transmit the discover response over the network 104' to the client-side appliance 200a.

On the client-side appliance 200a, the discovery engine 510a may wait for the receipt of the discover request from the server-side appliance 200b via the network 104'. In some embodiments, the discovery engine 510a may maintain a timer to keep track of time elapsed since the transmission of the discover request over the network 104'. The discovery engine 510a may compare the elapsed time since the transmission of the discover request to a time limit (e.g., 15 seconds to 3 minutes). If the elapsed time is less than the time limit, the discovery engine 510a may continue waiting for receipt of the discover response from the server-side appliance 200b via the network 104'. Conversely, if the elapsed time becomes greater than the time limit, the discovery engine 510a may determine that there is no other network device (e.g., the server-side appliance 200b) in the network 104' to facilitate communications between the client 102 and the server 106. In some embodiments, the discovery engine 510a may perform no further action in relation to the connection request from the client 102. In some embodiments, the discovery engine 510a may send a failure message (e.g., a network time-out notification) to the client 102 via the network 104. The failure message may include an indication that there are no intermediary network devices (e.g., the server-side appliance 200b) to facilitate communications with the server 106.

In some embodiments, the discovery engine 510a may receive the failure response from the server-side appliance 200b via the network 104'. The discovery engine 510a may determine that there is no other network device in the network 104' to facilitate communications between the client 102 and the server 106, upon receipt of the failure response. In some embodiments, the discovery engine 510a may perform no further action in relation to the connection request from the client 102. In some embodiments, the discovery engine 510a may send a failure message to the client 102 via the network 104. The failure message may include an indication that there are no intermediary network devices (e.g., the server-side appliance 200b) to facilitate communications with the server 106.

The discovery engine 510a may receive the discover response from the server-side appliance 200b via the network 104'. In some embodiments, the discovery engine 510a may intercept the discover response sent from the server-side appliance 200b via the network 104'. The client-side appliance 200a may reside on a communication path between the server 106 and the client 102. The network 104' may route communications destined to the client 102 to the client-side appliance 200a (e.g., using network address translation). As the destination address of the header in the discover response references the client 102, the network 104' may route or forward the discover response to the client-side appliance 200a. The discovery engine 510a may in turn receive or intercept the discover response sent from the server-side appliance 200b via the network 104'. Upon receipt of the discover response, the discovery engine 510a may parse the discover response to identify the payload. The discovery engine 510a may identify the virtual network address from the payload of the discover response from the server-side appliance 200b. The virtual network address may be the virtual IP address or virtual MAC address referencing the server-side appliance 200b. In some embodiments, the discovery engine 510a may parse the payload of the discover response to identify the virtual network address referencing the server-side appliance 200b.

In some embodiments, the security engine 515a may compare the security hash information from the discover response with the security hash information generated for the discover request. The comparison may be responsive to receipt of the discover response from the server-side appliance 200b. In some embodiments, the security engine 515a may parse the payload of the discover response received from the server-side appliance 200b to identify the security hash information. In some embodiments, the security engine 515b may validate the discover response based on the security hash information in the payload of the discover response. The validation may serve to prevent rogue requests by unauthorized or non-symmetric network devices besides the client-side appliance 200b from forming a connection with the client-side appliance 200a. The validation may also function as establishing trusted communications between the client-side appliance 200a and the server-side appliance 200b. If the security hash information from the discover response matches or corresponds to the security hash information generated for the discover request, the security engine 515a may determine that the validation of the discover response is success. In some embodiments, the security engine 515a may also determine that the discover response corresponds to the discover request. In some embodiments, the security engine 515a may determine that the server-side appliance 200b is symmetric to the client-side appliance 200a. A set of network devices may be symmetric, when the network devices can communicate with each other to establish the overlay tunnel. In addition, the set of symmetric network devices may have the same or similar configuration, such as bandwidth and data processing rate capabilities. The determination that both the client-side appliance 200a and the server-side appliance 200b are symmetric may indicate capability in terms of configuration in communicating between the two appliances. On the other hand, if security hash information from the discover response does not match or correspond to the security hash information generated for the discover request, the security engine 515a may determine that the discover response fails to be validated. In some embodiments, the security engine 515a may also determine that the discover response does not correspond to the discover request. In some embodiments, the security engine 515a may determine that the server-side appliance 200b is asymmetric to the client-side appliance 200a.

The communication engine 520a executing on the client-side appliance 200a may establish an overlay tunnel 530a-n (herein after generally referred to as overlay tunnel 530) between the client-side appliance 200a and the server-side appliance 200b. In some embodiments, the overlay tunnel 530 may be established responsive to receiving the discover response from the server-side appliance 200b indicating that the security hash information independently generated by the security engine 515b matches the security hash information of the discover request from the client-side appliance 200a. In some embodiments, the overlay tunnel 530 may be established responsive to determining that the security hash information from the discover response matches the security hash information set in the discover request. Otherwise, the overlay tunnel 530 may not be established responsive to determining that the security hash information from the discover response does not match the security hash information for the discover request. The overlay tunnel 530 may be established by the communication engine 520*a* using the virtual network address of the client-side appliance 200*a* and the virtual network address of the server-side appliance 200*b*. The virtual network addresses may be virtual IP addresses or virtual MAC addresses. The overlay tunnel 530 may be a peer-to-peer data path defined over and supported by the network 104' between the client-side appliance 200*a* and the server-side appliance 200*b* as the two network nodes. The overlay tunnel 530 may convey or transmit data exchanged between the client-side appliance 200*a* and the server-side appliance 200*b* over the network 104'. While the previously established network 104' may be public (e.g., the Internet) or private (e.g., a local area or wide area network with other network devices), access to the data communicated over the overlay tunnel 530 may be restricted to the client-side appliance 200*a* and the server-side appliance 200*b*. The overlay tunnel 530 may have a first end network address set to the virtual network address of the client-side appliance 200*a*. The overlay tunnel 530 may have a second end network address set to the virtual network address of the server-side appliance 200*b*.

In some embodiments, the communication engine 520*a* may store one or more properties of the overlay tunnel 530 onto the database 525*a*. With the properties of the overlay tunnel 530 stored onto the database 525*a*, the communication engine 520*a* may use the properties to set or modify the packets to be sent over the overlay tunnel 530. The one or more properties of the overlay tunnel 530 stored onto the database 525*a* may include the virtual network address of the client-side appliance 200*a* and the virtual network address server-side appliance 200*b*, among others. In some embodiments, the one or more properties of the overlay tunnel 530 stored onto the database 525*a* by the communication engine 520*a* may include the network address of the client 102 and the network address of the server 106 (e.g., the IP address or the MAC address). In some embodiments, the one or more properties of the overlay tunnel 530 stored onto the database 525*a* by the communication engine 520*a* may include the original source port number and the destination port number identified from the connection request received from the client 102.

In some embodiments, the overlay tunnel 530 may be established by the communication engine 520*a* in accordance with any number of network protocols for peer-to-peer or point-to-point communications, such as virtual private network (VPN), Secure Sockets Layer virtual private network (SSLVPN), Secure Socket Tunneling Protocol (SSTP), Generic Routing Encapsulation (GRE), Point-to-Point Protocol (PPP), and Internet Protocol Security (IPSec), among others. In some embodiments, the overlay tunnel 530 may use a network stack layer different from the network layer stack used to communicate the connection request, the discover request, or the discover response. For example, the overlay tunnel 530 may be in accordance with a transport layer protocol (e.g., TCP or UDP), while the network layer stack for communicating the connection request, the discover request, or the discover response may be in accordance with an application layer protocol (e.g., HTTPS). In this manner, the overlay tunnel 530 may leverage or utilizing previously established infrastructures in the network 104' to exchange communications between the client-side appliance 200*a* and the server-side appliance 200*b*.

In some embodiments, the communication engine 520*a* may transmit an acknowledgment message to the server-side appliance 200*b* to establish the overlay tunnel 530 in response to receipt of the discover response. The acknowledgement message may be generated by the communication engine 520*a* in accordance to any communications protocol at any network layer stack. The acknowledgement message may have a header and a payload. The header of the acknowledgement message may include a source address, a source port number, a destination address, and a destination port number. The communication engine 520*a* may set the source address to the virtual network address of the client-side appliance 200*a*. The communication engine 520*a* may set the source port number or the destination port number to the value (e.g., "5555"). In some embodiments, the communication engine 520*a* may set the destination address to the network address of the server-side appliance 200*b* used by the network 104'. In some embodiments, the communication engine 520*a* may set the destination address to the virtual network address of the server-side appliance 200*b* identified from the discover response. The communication engine 520*a* may insert or include an indication of acknowledgement of receipt into the payload of the acknowledgement message. Once generated, the communication engine 520*a* may send the acknowledgement message to the server-side appliance 200*b* to establish the overlay tunnel 530 over the network 104'. In response to receipt of the acknowledgement message, the server-side appliance 200*b* may open communications through the overlay tunnel 530 to exchange data between the client 102 and the server 106.

In some embodiments, the communication engine 520*a* may transmit or provide an acknowledgement message to the client 102. The acknowledgement message may be generated by the communication engine 520*a* in accordance to any communications protocol at any network layer stack. The acknowledgement message may have a header and a payload. The header of the acknowledgement message may include a source address, a source port number, a destination address, and a destination port number. The communication engine 520*a* may set the source address to the virtual network address of the client-side appliance 200*a*. The communication engine 520*a* may set the source port number or the destination port number to any arbitrary or random number. In some embodiments, the communication engine 520*a* may set the source port number to the destination port number of the header in the connection request from the client 102. In some embodiments, the communication engine 520*a* may set the destination port number to the source port number of the header in the connection request from the client 102. The communication engine 520*a* may set the destination address to the actual network address of the client 102 included in the source address of the header in the connection request. The communication engine 520*a* may insert or include an indication that connection with the server 106 is successful. Upon generation, the communication engine 520*a* may send the acknowledgement message to the client 102 via the network 104. In response to receipt of the acknowledgement message, the client 102 may commence sending of one or more data packets to the client-side appliance 200*a* in conjunction with the running of the application.

With the establishment of the overlay tunnel 530, the communication engine 520*a* may communicate data exchanged between the client 102 and the server 106 via the overlay tunnel 530. The data may be in the form of data packets or frames (or both) in accordance with any number of communications protocols at any network layer stacks, such as an application layer protocol (e.g., Hypertext Transfer Protocol (HTTP) or Transport Layer Security (TLS)), a transport layer protocol (e.g., Transmission Control Protocol (TCP), User Datagram Protocol (UDP), or Reliable Data Protocol (RDP)), or an internet layer protocol (e.g., Internet Protocol (IP) or Internet Protocol Security (IPsec)), among others. The data may be of the same communication protocol and the network layer stack as the discover request and the discover response. Each data packet may have a header and a payload. The header of each data packet may have a source address, a source port number, a destination address, and a destination port number, among others. The data packets may originate from the client 102 or from the server 106 via the server-side appliance 200*b*.

The communication engine 520*a* may receive the data packets from the client 102. Upon receipt of each data packet from the client 102, the communication engine 520*a* may parse the packet to identify the header and the payload. In some embodiments, the communication engine 520*a* may parse the header of the data packet to identify the source address, the source port number, the destination address, or the destination port number, among others. The source address of the data packet from the client 102 may be set to the actual network address of the client 102 (e.g., the IP address or MAC address). The destination address of the data packet from the client 102 may be set to the actual network address of the server 106. The source port number of the data packet may be set to a port of the client 102 from which the connection request is sent. The source port number of the data packet may be set to an arbitrary or random value, or may be specified by the application running on the client 102. For example, when the application is agnostic to the port number, the source port number may be set to an arbitrary or random number, besides previously registered numbers. The destination port number of the data packet may be set to a port of the server 106 on which the connection request is to be received. The destination port number of the data packet may be set to an arbitrary or random value, or may be specified by the application running on the client 102. The payload of the data packet may include contents for carrying out one or more functionalities of the application running on the client 102.

In some embodiments, the communication engine 520*a* may determine whether each data packet received from the client 102 is destined to the server 106. With the header parsed from the data packet, the communication engine 520*a* may compare the source address and the destination address with the one or more properties of the overlay tunnel 530 maintained on the database 525*a*. As discussed above, the source address of the data packet from the client 102 may be the actual network address referencing the client 102 and the destination address of the data packet from the client 102 may be the actual network address referencing the server 106. The communication engine 520*a* may determine whether the source address in the data packet matches the actual network address of the client 102 for the overlay tunnel 530. In addition, the communication engine 520*a* may determine whether the destination address in the data packet matches the actual network address of the server 106 for the overlay tunnel 530. When the source address matches the actual network address of the client 102 and the destination address matches the actual network address of the server 106 for the overlay tunnel 530, the communication engine 520*a* may determine that the received data packet is destined to the server 106. Otherwise, when the source address does not match the actual network address of the client 102 or the destination address does not match the actual network address of the server 106 for the overlay tunnel 530, the communication engine 520*a* may determine that the received data packet is not destined to the server 106.

The communication engine 520*a* may route, feed, forward, or otherwise direct each data packet received from the client 102 into the overlay tunnel 530. In some embodiments, the communication engine 520 may direct the data packet received from the client 102 into the overlay tunnel 530, responsive to determining that data packet is destined to the server 106. In directing each data packet through the overlay tunnel 530, the communication engine 520*a* may encapsulate the data packet received from the client 102. In some embodiments, the communication engine 520*a* may encapsulate the data packet by altering or modifying the header. The communication engine 520*a* may set the source address of the header in the data packet to the virtual network address corresponding to the client-side appliance 200*a* (e.g., virtual IP address or virtual MAC address). The communication engine 520*a* may set the destination address of the header in the data packet to the virtual network address corresponding to the server-side appliance 200*b* (e.g., virtual IP address or virtual MAC address). In some embodiments, the communication engine 520*a* may set the source port number to the value (e.g., "5555"). In some embodiments, the communication engine 520*a* may set the destination port number to the value (e.g., "5555"). The communication engine 520*a* may maintain the payload of the data packet received from the client 102. With the encapsulation of each data packet, the communication engine 520*a* may transmit or send the modified data packet over the overlay tunnel 530 to the server-side appliance 200*b*.

In some embodiments, the communication engine 520*a* may encapsulate the data packet by generating a frame to contain the data packet to direct into the overlay tunnel 530 to the server-side appliance 200*b*. The frame may include the data packet received from the client 102. The frame may include a header and a payload in accordance to a communication protocol at a network layer stack different from the network layer stack of the data packet received from the client 102. For example, the frame may be in accordance with a transport layer protocol (e.g., TCP or UDP), while the network layer stack for the data packet from the client 102 may be in accordance with an application layer protocol (e.g., HTTPS). The frame may be generated by the communication engine 520*a* in accordance with the same communication protocol as the communication protocol of the overlay tunnel 530. The header of the frame may include a source address, a source port number, a destination address, and a destination port number. The communication engine 520*a* may set the source address of the header in the frame to the virtual network address corresponding to the client-side appliance 200*a* (e.g., virtual IP address or virtual MAC address). The communication engine 520*a* may set the destination address of the header in the frame to the virtual network address corresponding to the server-side appliance 200*b* (e.g., virtual IP address or virtual MAC address). In some embodiments, the communication engine 520*a* may set the source port number to the value (e.g., "5555"). In some embodiments, the communication engine 520*a* may set the destination port number to the value (e.g., "5555"). In some embodiments, the communication engine 520*a* may include the data packet from the client 102 into the frame. In some embodiments, the communication engine 520*a* may insert the payload of the data packet from the client 102 into the payload of the frame to send through the overlay tunnel 530.

The communication engine 520*b* executing on the server-side appliance 200*b* may communicate data packets exchanged between the client 102 and the server 106 via the overlay tunnel 530. In some embodiments, the communication engine 520*b* may initiate communication of data between the client 102 and the server 106 via the overlay tunnel 530, responsive to receipt of the acknowledgement message sent from the client-side appliance 200*a*. In some embodiments, the communication engine 520*b* may store the one or more properties of the overlay tunnel 530 onto the database 525*b* in response to establishment of the overlay tunnel 530. With the properties of the overlay tunnel 530 stored onto the database 525*b*, the communication engine 520*b* may use the properties to set or modify the packets to be sent over the overlay tunnel 530. The one or more properties of the overlay tunnel 530 stored onto the database 525*b* may include the virtual network address of the client-side appliance 200*a* and the virtual network address of the server-side appliance 200*b*, among others. In some embodiments, the communication engine 520*b* may associate the virtual network address of the client-side appliance 200*a* and the virtual network address of the server-side appliance 200*b* as associated with the overlay tunnel 530. In some embodiments, the one or more properties of the overlay tunnel 530 stored onto the database 525*b* may include the actual network address of the client 102 and the network address of the server 106 (e.g., the IP address or the MAC address).

From the overlay tunnel 530, the communication engine 520*b* may receive the data packet sent from the client-side appliance 200*a*. As the destination address of the header in the data packet is set to virtual network address of the server-side appliance 200*b*, the communication engine 520*b* may receive the data packet sent through the overlay tunnel 530. Upon receipt of each data packet from the overlay tunnel 530, the communication engine 520*b* may parse the data packet to identify the header and the payload. The communication engine 520*b* may decapsulate the data packet received via the overlay tunnel 530 by resetting the header to the original values. In some embodiments, the communication engine 520*b* may access the database 525*b* to retrieve or identify the one or more properties of the overlay tunnel 530, such as the actual network address of the client 102 and the actual network address of the server 106, among others. With the identification of the one or more properties of the overlay tunnel 530, the communication engine 520*b* may set the destination address of the data packet to the actual network address of the server 106. In some embodiments, the communication engine 520*b* may set the source address of the data packet to the actual network address of the client 102. In some embodiments, the communication engine 520*b* may set the source port number of the data packet received via the overlay tunnel 530 from the value (e.g., "5555") to the original source port number. In some embodiments, the communication engine 520*b* may set the destination port number of the data packet received via the overlay tunnel 530 from the value (e.g., "5555") to the original destination port number. The communication engine 520*b* may maintain the payload of the data packet received via the overlay tunnel 530. Once each data packet is decapsulated, the communication engine 520*b* may send the decapsulated data packet to the server 106 via the network 104". In some embodiments, the communication engine 520*b* may send a partially decapsulated data packet to the server 106 via the network 104". The partially decapsulated data packet may have the destination address set to the actual network address of the server 106 and the destination port number set to the original destination port number.

In some embodiments, the communication engine 520*b* may decapsulate the frame received via the overlay tunnel 530 by retrieving the original data packet included within the frame. In some embodiments, the communication engine 520*b* may parse the frame to identify the data packet from the client 102. In some embodiments, the communication engine 520*b* may strip the header from the frame to identify the data packet originally from the client 102 to decapsulate. As discussed above, the header of the frame received via the overlay tunnel 530 may include the source address set to the virtual network address of the client-side appliance 200*a*, the source port number set to the value, the destination address set to the virtual network address of the server-side appliance 200*b*, and the destination port number set to the value, among others. The header of the data packet originally from the client 102 may include the source address set to the actual network address of the client 102, the original source port number, the destination address set to the actual network address of the server 106, and the original destination port number. With the decapsulation of the data packet from the frame, the communication engine 520*b* may send the data packet to the server 106 via the network 104".

The communication engine 520*b* may receive the data packets from the server 106. The data packets may be in accordance with any number of communications protocols at any network layer stacks, such as an application layer protocol (e.g., Hypertext Transfer Protocol (HTTP) or Transport Layer Security (TLS)), a transport layer protocol (e.g., Transmission Control Protocol (TCP), User Datagram Protocol (UDP), or Reliable Data Protocol (RDP)), or an internet layer protocol (e.g., Internet Protocol (IP) or Internet Protocol Security (IPsec)), among others. The data packets may be of the same communication protocol and the network layer stack as the discover request and the discover response. Each data packet may have a header and a payload. The header of each data packet may have a source address, a source port number, a destination address, and a destination port number, among others. The data packets may originate from the client 102 via the client-side appliance 200*a* or from the server 106.

Upon receipt of each data packet from the server 106, the communication engine 520*b* may parse the packet to identify the header and the payload. In some embodiments, the communication engine 520*b* may parse the header of the data packet to identify the source address, the source port number, the destination address, or the destination port number, among others. The source address of the data packet from the server 106 may be set to the actual network address of the server 106 (e.g., the IP address or MAC address). The destination address of the data packet from the server 106 may be set to the actual network address of the client 102. The source port number of the data packet may be set to a port of the server 106 from which the data packet is sent. The source port number of the data packet may be set to an arbitrary or random value, or may be specified by the application running on the client 102. The destination port number of the data packet may be set to a port of the client 102 on which the data packet is to be received. The destination port number of the data packet may be set to an arbitrary or random value, or may be specified by the application running on the client 102. The payload of the data packet may include contents for carrying out one or more functionalities of the application running on the client 102 in response to communications from the client 102.

In some embodiments, the communication engine 520*b* may determine whether each data packet received from the server 106 is destined to the client 102. With the header parsed from the data packet, the communication engine 520*b* may compare the source address and the destination address with the one or more properties of the overlay tunnel 530 maintained on the database 525*a*. As discussed above, the source address of the data packet from the server 106 may be the actual network address referencing the server 106 and the destination address of the data packet from the server 106 may be the actual network address referencing the client 102. The communication engine 520*b* may determine whether the source address in the data packet matches the actual network address of the server 106 for the overlay tunnel 530. In addition, the communication engine 520*b* may determine whether the destination address in the data packet matches the actual network address of the client 102 for the overlay tunnel 530. When the source address matches the actual network address of the server 106 and the destination address matches the actual network address of the client 102 for the overlay tunnel 530, the communication engine 520*b* may determine that the received data packet is destined to the client 102. Otherwise, when the source address does not match the actual network address of the server 106 or the destination address does not match the actual network address of the client 102 for the overlay tunnel 530, the communication engine 520*b* may determine that the received data packet is not destined to the client 102.

The communication engine 520*b* may route, feed, forward, or otherwise direct each data packet received from the server 106 into the overlay tunnel 530. In some embodiments, the communication engine 520 may direct the data packet received from the server 106 into the overlay tunnel 530, responsive to determining that data packet is destined to the client 102. In directing each data packet through the overlay tunnel 530, the communication engine 520*b* may encapsulate the data packet received from the server 106. In some embodiments, the communication engine 520*b* may encapsulate the data packet by altering or modifying the header. The communication engine 520*b* may set the source address of the header in the data packet to the virtual network address corresponding to the server-side appliance 200*a* (e.g., virtual IP address or virtual MAC address). The communication engine 520*b* may set the destination address of the header in the data packet to the virtual network address corresponding to the client-side appliance 200*a* (e.g., virtual IP address or virtual MAC address). In some embodiments, the communication engine 520*b* may set the source port number to the value (e.g., "5555"). In some embodiments, the communication engine 520*b* may set the destination port number to the value (e.g., "5555"). The communication engine 520*b* may maintain the payload of the data packet received from the server 106. With the encapsulation of each data packet, the communication engine 520*b* may transmit or send the modified data packet over the overlay tunnel 530 to the client-side appliance 200*a*.

In some embodiments, the communication engine 520*b* may encapsulate the data packet by generating a frame to contain the data packet to direct into the overlay tunnel 530 to the client-side appliance 200*a*. The frame may include the data packet received from the server 106. The frame may include a header and a payload in accordance to a communication protocol at a network layer stack different from the network layer stack of the data packet received from the server 106. For example, the frame may be in accordance with a transport layer protocol (e.g., TCP or UDP), while the network layer stack for the data packet from the server 106 may be in accordance with an application layer protocol (e.g., HTTPS). The frame may be generated by the communication engine 520*b* in accordance with the same communication protocol as the communication protocol of the overlay tunnel 530. The header of the frame may include a source address, a source port number, a destination address, and a destination port number. The communication engine 520*b* may set the source address of the header in the frame to the virtual network address corresponding to the server-side appliance 200*b* (e.g., virtual IP address or virtual MAC address). The communication engine 520*b* may set the destination address of the header in the frame to the virtual network address corresponding to the client-side appliance 200*a* (e.g., virtual IP address or virtual MAC address). In some embodiments, the communication engine 520*b* may set the source port number to the value (e.g., "5555"). In some embodiments, the communication engine 520*b* may set the destination port number to the value (e.g., "5555"). In some embodiments, the communication engine 520*b* may include the data packet from the server 106 into the frame. In some embodiments, the communication engine 520*b* may insert the payload of the data packet from the server 106 into the payload of the frame to send through the overlay tunnel 530.

The communication engine 520*a* may in turn receive the data packets originating from the server 106 from the server-side appliance 200*b* via the overlay tunnel 530. As the destination address of the header in the data packet is set to virtual network address of the client-side appliance 200*a*, the communication engine 520*a* may receive the data packet sent through the overlay tunnel 530. Upon receipt of each data packet from the overlay tunnel 530, the communication engine 520*a* may parse the data packet to identify the header and the payload. The communication engine 520*a* may decapsulate the data packet received via the overlay tunnel 530 by resetting the header to the original values. In some embodiments, the communication engine 520*a* may access the database 525*a* to retrieve or identify the one or more properties of the overlay tunnel 530, such as the actual network address of the server 106 and the actual network address of the client 102, among others. With the identification of the one or more properties of the overlay tunnel 530, the communication engine 520*a* may set the destination address of the data packet to the actual network address of the client 102. In some embodiments, the communication engine 520*a* may set the source address of the data packet to the actual network address of the server 106. In some embodiments, the communication engine 520*a* may set the source port number of the data packet received via the overlay tunnel 530 from the value (e.g., "5555") to the original source port number. In some embodiments, the communication engine 520*a* may set the destination port number of the data packet received via the overlay tunnel 530 from the value (e.g., "5555") to the original destination port number. The communication engine 520*a* may maintain the payload of the data packet received via the overlay tunnel 530. Once each data packet is decapsulated, the communication engine 520*a* may send the decapsulated data packet to the client 102 via the network 104. In some embodiments, the communication engine 520*a* may send a partially decapsulated data packet to the client 102 via the network 104. The partially decapsulated data packet may have the destination address set to the actual network address of the client 102 and the destination port number set to the original destination port number.

In some embodiments, the communication engine 520a may decapsulate the frame received via the overlay tunnel 530 by retrieving the original data packet included within the frame. In some embodiments, the communication engine 520a may parse the frame to identify the data packet from the server 106. In some embodiments, the communication engine 520a may strip the header from the frame to identify the data packet originally from the server 106 to decapsulate. As discussed above, the header of the frame received via the overlay tunnel 530 may include the source address set to the virtual network address of the server-side appliance 200b, the source port number set to the value, the destination address set to the virtual network address of the client-side appliance 200a, and the destination port number set to the value, among others. The header of the data packet originally from the server 106 may include the source address set to the actual network address of the server 106, the original source port number, the destination address set to the actual network address of the client 102, and the original destination port number. With the decapsulation of the data packet from the frame, the communication engine 520a may send the data packet to the client 102 via the network 104.

Subsequent to the establishment of the overlay tunnel 530, the discovery engine 510a executing on the client-side appliance 200a may receive an update request to modify or change the overlay tunnel 530. In some embodiments, the discovery engine 510a may receive the update request from the server-side appliance 200b. In some embodiments, the discovery engine 510a may receive the update request from an alternate or another server-side appliance 200b' in communication with the server 106 via the network 104". In some embodiments, the discovery engine 510a may receive the update request from a network administration device in communication with the client-side appliance 200a. The update request may be generated in response to the network administration device changing network addresses and virtual network addresses of the network devices connected to the network 104', such as the client-side appliance 200a or the server-side appliance 200b. The change in network addresses or virtual network addresses may be in accordance with a network management protocol (e.g., Dynamic Host Configuration Protocol (DHCP)). The update request may be received through the network 104' outside the overlay tunnel 530 established between the client-side appliance 200a and the server-side appliance 200b. The update request received by the discovery engine 510a may include a new virtual network address, such as a new virtual IP address or a virtual MAC address. The new virtual network address may correspond to the same server-side appliance 200b or another server-side appliance 200b'. In some embodiments, the discovery engine 510a may parse the update request to identify the new virtual network address of the server-side appliance 200b.

Using the new virtual network address of the server-side appliance 200b, the discovery engine 510a may change the overlay tunnel 530 established between the client-side appliance 200a and the server-side appliance 200b. The changing of the overlay tunnel 530 using the new virtual network address may be in accordance with any number of any number of network protocols for peer-to-peer or point-to-point communications. In some embodiments, the discovery engine 510a may store the new virtual network address corresponding to the server-side appliance 200b or 200b' onto the database 525b as associated with the overlay tunnel 530. In some embodiments, the discovery engine 510a may encapsulate each subsequent incoming data packets from the client 102 using the new virtual network address from the update request. In some embodiments, the discovery engine 510a may encapsulate each subsequent data packet by altering or modifying the header. The communication engine 520a may set the source address of the header in the data packet to the virtual network address corresponding to the client-side appliance 200a. The communication engine 520a may set the destination address of the header in the data packet to the new virtual network address corresponding to the server-side appliance 200b or 200b' from the update request. In some embodiments, the communication engine 520a may set the source port number to the value (e.g., "5555"). In some embodiments, the communication engine 520a may set the destination port number to the value (e.g., "5555"). The communication engine 520a may maintain the payload of the data packet received from the client 102. Upon encapsulation, the communication engine 520a may transmit or send the modified data packet over the overlay tunnel 530 to the server-side appliance 200b.

In some embodiments, the discovery engine 510a may generate a connection initiation message to send to the server-side appliance 200b or 200b' corresponding to the new virtual network address, prior to sending data packets via the overlay tunnel 530. The connection initiation message may be generated by the communication engine 520a in accordance to any communications protocol at any network layer stack. The connection initiation message may have a header and a payload. The header of the connection initiation message may include a source address, a source port number, a destination address, and a destination port number. The communication engine 520a may set the source address to the virtual network address of the client-side appliance 200a. The virtual network address of the client-side appliance 200a may remain unchanged and may be the same as prior to receipt of the update request. The communication engine 520a may set the source port number or the destination port number to the value (e.g., "5555"). In some embodiments, the communication engine 520a may set the destination address to the actual network address of the server-side appliance 200b used by the network 104'. In some embodiments, the communication engine 520a may set the destination address to the new virtual network address of the server-side appliance 200b or 200b' from the update request. Once generated, the communication engine 520a may send the connection initiation message to the server-side appliance 200b or 200b' corresponding to the new virtual network address to establish the overlay tunnel 530 over the network 104'. In some embodiments, the communication engine 520a may establish a new overlay tunnel 530 using the new virtual network address over the network 104'. The establishment of the new overlay tunnel 530 may be in accordance with any number of network protocols for peer-to-peer or point-to-point communications. In response to receipt of the connection initiation message, the server-side appliance 200b or 200'b may open communications through the overlay tunnel 530 to exchange data between the client 102 and the server 106.

In this manner, plugging in or otherwise communicatively coupling the client 102 with the client-side appliance 200a may allow the client 102 to exchange data with the server 106, without any additional hardware or software configuration on the client 102. This may reduce hardware or software complexity on the client 102 and may also improve the utility of the client 102 in communicating with various network devices. Once connected, communications may be reliably and seamlessly exchanged between the client 102 and the server 106 through the client-side appliance 200a and the server-side appliance 200b. In addition, the communications between the client 102 and the server 106 may be maintained through the overlay tunnel 530 even with the change of the virtual network address of the server-side appliance 200b. The client-side appliance 200a and the server-side appliance 200b may dynamically adjust or modify the overlay tunnel 530 in response to various changes in the network 104'.

Figure 6:
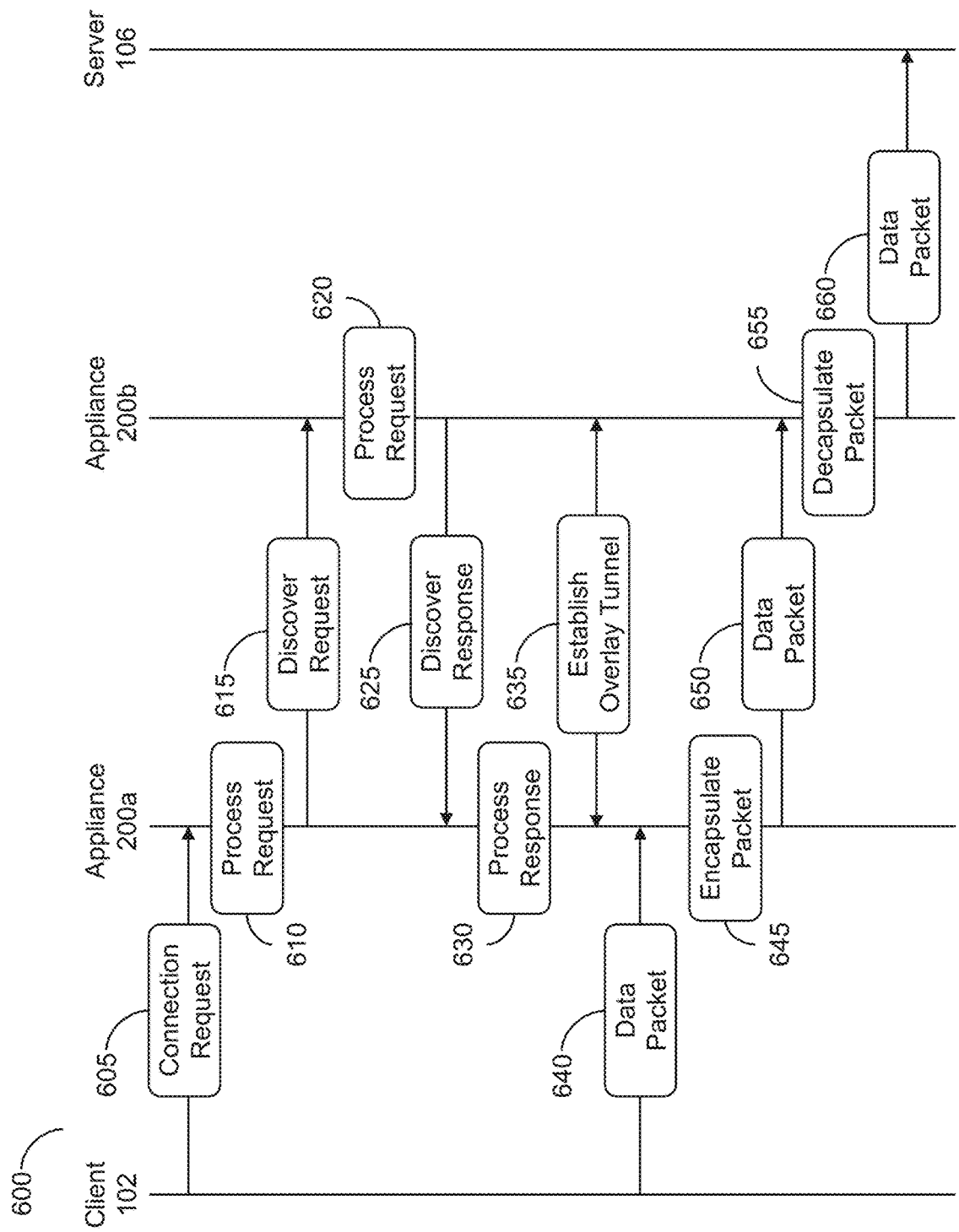
FIG. 6 is a functional band diagram of a sequence of forming overlay tunnels for delivery of data between devices in networked environments.

Referring now to FIG. 6, depicted is a function diagram for a sequence 600 of using tunnels according to a security level of the communications. The functionalities of sequence 600 may be implemented using, or performed by, the components described in FIGS. 1-5, such as the client 102, the client-side appliance 200a, the server-side appliance 200b, and the server 106. In brief overview, the client 102 may send a connection request to the client-side appliance 200a (605). The client-side appliance 200a may process the connection request (610). The client-side appliance 200a may send a discover request to the server-side appliance 200b (615). The server-side appliance 200b may process the discover request (620). The server-side appliance 200b may send a discover response to the client-side appliance 200a (625). The client-side appliance 200a may process the discover response (630). The client-side appliance 200a and the server-side appliance 200b may establish the overlay tunnel 530 (635). The client 102 may send a data packet (640). The client-side appliance 200a may encapsulate the data packet (645). The client-side appliance 200a may send a frame to the server-side appliance 200b (650). The server-side appliance 200b may decapsulate the data packet (655). The server-side appliance 200b may send the data packet to the server 106 (660).

In further detail, the client 102 may send a connection request to the client-side appliance 200a (605). The connection request may be generated in conjunction with the running of an application on the client 102. The connection request may include a header and a payload. The header may include a source address, a source port number, a destination address, and a destination port number. The source address may be an actual IP address corresponding to the client 102. The destination address may be an actual IP address corresponding to the server 106.

The client-side appliance 200a may process the connection request (610). As the client-side appliance 200a may reside along the same data path as the server 106, the client-side appliance 200a may receive the connection request sent by the client 102. The client-side appliance 200a may forward the connection request along to the server 106. The client-side appliance 200a may parse the connection request to identify the header and the payload. The client-side appliance 200a may send a discover request to the server-side appliance 200b (615). The client-side appliance 200a may generate the discover request using the connection request. For example, the client-side appliance 200a may parse the connection request to identify header values, such as a destination address, to use to generate the discover request. The discover request may include a header and a payload. The header may include a source address, a source port number, a destination address, and a destination port number. The source address may be set to a virtual IP address of the client-side appliance 200a. The source port number may be set to a value. The destination port number may be set to the value. The value may be registered for overlay communications. The destination port number may be set to the actual IP address corresponding to the server 106. The client-side appliance 200a may generate secure hash information using the payload of the connection request from the client 102. Once generated, the client-side appliance 200a may include the secure hash information into the payload of the discover request.

The server-side appliance 200b may process the discover request (620). The server-side appliance 200b may receive the discover request sent from the client-side appliance 200a, as the server-side appliance 200b may reside along the same data path as the server 106. Upon receipt of the discover request, the server-side appliance 200b may parse the discover request to identify the header and the payload. The server-side appliance 200b may parse the header of the discover request to identify the destination port number. The server-side appliance 200b may compare the destination port number identified from the discover request with the value for overlay communications. When the destination port number does not match the value, the server-side appliance 200b may perform no further action. On the other hand, when the destination port number matches the value, the server-side appliance 200b may generate secure hash information using the header of the discovery request from the client 102. The server-side appliance 200b may then compare the independently generated secure hash information with the secure hash information of the payload in the discover request from the client-side appliance 200a. When the secure hash information from the connection request and the secure hash information from the discover request do not match, the server-side appliance 200b may perform no further action.

The server-side appliance 200b may send a discover response to the client-side appliance 200a (625). In contrast, when the independently generated secure hash information and the secure hash information from the payload of the discover request match, the server-side appliance 200b may generate the discover response. The discover response may include a header and a payload. The header may include a source address, a source port number, a destination address, and a destination port number. The source address may be set to the actual IP address of the server-side appliance 200b. The source port number may be set to a value. The destination port number may be set to the value. The value may be registered for overlay communications. The destination address may be set the actual IP address of the client 102. The server-side appliance 200b may include the virtual IP address of the server-side appliance 200b into the payload of the discover response.

The client-side appliance 200a may process the discover response (630). As the client-side appliance 200a may reside along the data path to the client 102, the client-side appliance 200a may receive the discover response from the server-side appliance 200b. The client-side appliance 200a may parse the discover response to identify the header and the payload. From the payload, the client-side appliance 200a may identify the virtual IP address of the server-side appliance 200b. The client-side appliance 200a and the server-side appliance 200b may establish an overlay tunnel 530 (635). Using the virtual IP address of the client-side appliance 200a and the virtual IP address of the server-side appliance 200b, the overlay tunnel 530 may be established. The overlay tunnel 530 may be a peer-to-peer or point-to-point communication data path formed over the network 104'.

The client 102 may send a data packet (640). The data packet may include a header and a payload. The header may include a source address, a source port number, a destination address, and a destination port number. The source address may be an actual IP address corresponding to the client 102. The destination address may be an actual IP address corresponding to the server 106.

The client-side appliance 200a may encapsulate the data packet (645). As the client-side appliance 200a may reside along the same data path as the server 106, the client-side appliance 200a may receive the data packet sent by the client 102. To encapsulate the data packet from the client 102, the client-side appliance 200a may modify the header of the data packet. The client-side appliance 200a may set the source address of the header in the data packet to the virtual IP address of the client-side appliance 200a. The client-side appliance 200a may set the source port number of the header in the data packet to the value for overlay communications. The client-side appliance 200a may set the destination address of the header in the data packet to the virtual IP address of the server-side appliance 200b. The client-side appliance 200a may set the destination port number of the header in the data packet to the value for overlay communications. The client-side appliance 200a may maintain the payload of the data packet. The client-side appliance 200a may send the encapsulated data packet to the server-side appliance 200b (650). The encapsulated data packet may be directed or sent through the overlay tunnel 530.

The server-side appliance 200b may decapsulate the data packet (655). The server-side appliance 200b may receive the encapsulated data packet from the client-side appliance 200a via the overlay tunnel 530. Upon receipt of the encapsulated data packet, the server-side appliance 200b may parse the encapsulated data packet to identify the header and the payload. To decapsulate, the server-side appliance 200b may set the header to the original value of the data packet prior to receipt by the header-side appliance 200a. The server-side appliance 200b may set the source address of the header in the data packet to the actual IP address of the client 102. The server-side appliance 200b may set the source port number of the header in the data packet to the original value. The server-side appliance 200b may set the destination address of the header in the data packet to the actual IP address of the server 106. The server-side appliance 200b may set the destination port number of the header in the data packet to the original value. The server-side appliance 200b may maintain the payload of the data packet. The server-side appliance 200b may send the data packet to the server 106 (660). As the destination address of the decapsulated data packet may reference the server 106, the server 106 may receive the data packet from the server-side appliance 200b.

Figure 7:
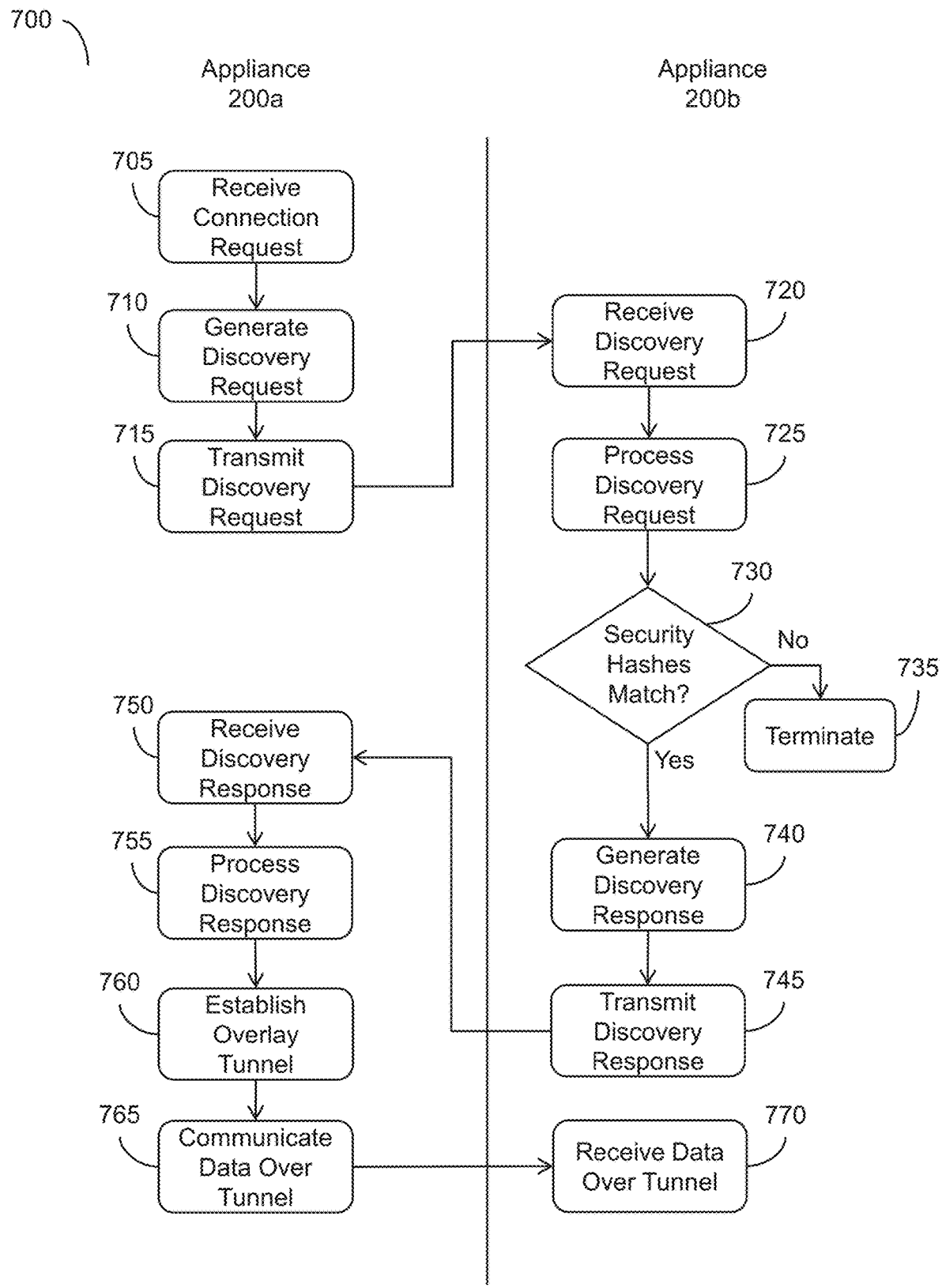
FIG. 7 is a flow diagram of a method of forming overlay tunnels for delivery of data between devices in networked environments.

Referring now to FIG. 7, depicted is a flow diagram for a method 700 of using tunnels according to a security level of the communications. The functionalities of method 700 may be implemented using, or performed by, the components described in FIGS. 1-5, such as the client 102, the client-side appliance 200a, the server-side appliance 200b, and the server 106. In brief overview, a client-side appliance may receive a connection request (705). The client-side appliance may generate a discover request (710). The client-side appliance may transmit the discover request (715). The server-side appliance may receive the discover request (720). The server-side appliance may process the discover request (725). The server-side appliance may determine whether secure hashes match (730). If determined not to match, the server-side appliance may terminate (735). Otherwise, if determined to match, the server-side appliance may generate a discover response (740). The server-side appliance may transmit the discover response (745). The client-side appliance may receive the discover response (750). The client-side appliance may process the discover response (755). The client-side appliance may establish an overlay tunnel (760). The client-side appliance may communicate data via the overlay tunnel (765). The server-side appliance may receive the data via the overlay tunnel (770).

In further detail, the client-side appliance (e.g., the client-side appliance 200a) may receive a connection request (705). The connection request may be generated in conjunction with the running of an application on the client (e.g., the client 102). The connection request may include a header and a payload. The header may include a source address, a source port number, a destination address, and a destination port number. The source address may include an actual network address (e.g., an IP or MAC address) corresponding to the client. The destination address may include an actual network address corresponding to the server (e.g., the server 106). The source port number and the destination port number may be set by the application running on the client. The client-side appliance may reside on the same data path between the client and the server. As such, the client-side appliance may receive the connection request destined to the server. The client-side appliance may forward the connection request toward the server.

The client-side appliance may generate a discover request (710). The client-side appliance may use the connection request received from the client to generate the discover request. The client-side appliance may parse the connection request to identify the header and the payload of the connection request. The discover request may include a header and a payload. The header may include a source address, a source port number, a destination address, and a destination port number. The client-side appliance may set the source address of the header in the discover request to a virtual network address (e.g., a virtual IP or MAC address) corresponding to the client-side appliance. The client-side appliance may set the destination address of the header in the discover request to the actual network address corresponding to the server from the connection request. The client-side appliance may set the source port number of the header in the discover request to a value. The client-side appliance may set the destination port number of the header in the discover request to a value. The value may be registered for overlay communications. In addition, the client-side appliance may generate a security hash using the payload of the connection request. Once generated, the client-side appliance may insert the security hash into the payload of the discover request. The client-side appliance may transmit the discover request (715).

The server-side appliance may receive the discover request (720). The server-side appliance may reside on the same data path between the client and the server. As such, the server-side appliance may receive the discover request destined to the server. As the destination address of the discover request is set to the actual network address corresponding to the server, the server-side appliance residing on the same data path may receive the discover request sent by the client-side appliance.

The server-side appliance may process the discover request (725). The server-side appliance may parse the discover request to identify the header and the payload. From the header, the server-side appliance may identify the source port number or the destination port number. The server-side appliance may compare the source port number or the destination port number to the value registered to overlay communications. If the source port number or the destination port number does not match the value, the server-side appliance may perform no further action in processing the discover request. Conversely, if the source port number or the destination port number matches the value, the server-side appliance may further process the discover request.

The server-side appliance may determine whether security hashes match (730). From the payload of the discover request, the server-side appliance may identify the security hash. In conjunction, the server-side appliance may parse the discover request to identify the header. The server-side appliance may independently generate the security hash using the header of the discover request. The server-side appliance may compare the security hash identified from the discover request with the independently generated security hash. If the security hashes are determined not to match, the server-side appliance may terminate (735). The server-side appliance may also determine that the discover request is not validated.

On the other hand, if the security hashes are determined to match, the server-side appliance may generate a discover response (740). The server-side appliance may use the discover request to generate the discover response. The discover response may include a header and a payload. The header may include a source address, a source port number, a destination address, and a destination port number. The server-side appliance may set the source address of the header in the discover response to the actual network address of the server-side appliance. The server-side appliance may set the destination address of the header in the discover response to the virtual network address corresponding to the client-side appliance. The server-side appliance may set the source port number of the header in the discover response to a value. The server-side appliance may set the destination port number of the header in the discover response to a value. The value may be registered for overlay communications. In addition, the server-side appliance may insert a virtual network address of the server-side appliance into the payload of the discover response. The server-side appliance may transmit the discover response (745).

The client-side appliance may receive the discover response (750). As the client-side appliance may reside on the same data path to the client, the client-appliance may receive the discover response sent by the server-side appliance. The client-side appliance may process the discover response (755). The client-side appliance may parse the discover response to identify the header and the payload. From the header, the client-side appliance may identify the source port number or the destination port number. The client-side appliance may compare the source port number or the destination port number to the value registered to overlay communications. If the source port number or the destination port number does not match the value, the client-side appliance may perform no further action in processing the discover response. Conversely, if the source port number or the destination port number matches the value, the client-side appliance may continue processing the discover response.

The client-side appliance may establish an overlay tunnel (e.g., the overlay tunnel 530) (760). Using the virtual network address of the client-side appliance and the virtual network address of the server-side appliance, the client-side appliance may establish the overlay tunnel. The overlay tunnel may be a peer-to-peer or point-to-point communication data path formed over a network between the client-side appliance and the server-side appliance. The client-side appliance may communicate data via the overlay tunnel (765). The data may be in the form of a data packet. The data packet may include a header and a payload. The header may include a source address, a source port number, a destination address, and a destination port number. The source address may be an actual IP address corresponding to the client. The destination address may be an actual IP address corresponding to the server. The client-side appliance may encapsulate the data packet received from the client by modifying the header. The client-side appliance 200a may set the source address of the header in the data packet to the virtual network address of the client-side appliance. The client-side appliance may set the source port number of the header in the data packet to the value for overlay communications. The client-side appliance may set the destination address of the header in the data packet to the virtual network address of the server-side appliance. The client-side appliance may set the destination port number of the header in the data packet to the value for overlay communications.

The server-side appliance may receive the data via the overlay tunnel (770). Upon receipt of the encapsulated data packet (e.g., data packet 650), the server-side appliance may parse the encapsulated data packet to identify the header and the payload. To decapsulate, the server-side appliance may set the header to the original value of the data packet prior to receipt by the header-side appliance. The server-side appliance may set the source address of the header in the data packet to the actual IP address of the client. The server-side appliance may set the source port number of the header in the data packet to the original value. The server-side appliance may set the destination address of the header in the data packet to the actual network address of the server. The server-side appliance may set the destination port number of the header in the data packet to the original port number. Once decapsulated, the server-side appliance may send and forward the data packet (e.g., data packet 660) to the server.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

We claim:

1. A method comprising:
   sending, by a sender device, a first request to establish a connection between the sender device and a receiver device;
   receiving the first request at a first device between the sender device and the receiver device;
   communicating, by the first device, responsive to the first request, a second request to discover a second device between the sender device and the receiver device to which to establish a tunnel between the first device and the second device, the second request comprising information identifying a result of a function applied to at least a portion of a payload of the first request;
   establishing, by the first device based in part on information of a response to the second request from a second device, a tunnel between the first device and the second device; and
   communicating, via the tunnel, data between the sender device and the receiver device;
   wherein the response is communicated by the second device responsive to a result of the second device applying the function of a hash to the at least the portion of the first request matching the information of the second request.

2. The method of claim 1, wherein the second request has a source internet protocol (IP) address of a first virtual IP address of the first device and the response identifies a second virtual IP address of the second device.

3. The method of claim 2, further comprising establishing the tunnel using the first virtual IP address of the first device and the second virtual IP address of the second device.

4. The method of claim 1, further comprising communicating the second request with a destination port set to a value to cause the second device to respond to the second request.

5. The method of claim 1, further comprising communicating the second request with the at least the portion of the first request as part of a payload of the second request.

6. The method of claim 1, further comprising redirecting, by the first device, data received from the sender device to the tunnel to be transmitted to the receiver device.

7. A system comprising:
   a first device configured to:
     receive a first request to establish a connection between a sender device and a receiver device, and responsive to receipt of the first request, communicate a second request to discover a second device between the sender device and the receiver device to which to establish a tunnel, wherein the second request includes information identifying a result of a function applied to at least a portion of a payload of the first request;
     establish, based in part on information of a response to the second request from a second device, a tunnel between the first device and the second device; and
     communicate via the tunnel data between the sender device and the receiver device;
   wherein the response is communicated by the second device responsive to a result of the second device applying the function of a hash to the at least the portion of the first request matching the information of the second request.

8. The system of claim 7, wherein the second request has a source internet protocol (IP) address of a first virtual IP address of the first device and the response identifies a second virtual IP address of the second device.

9. The system of claim 8, wherein the tunnel is established using the first virtual IP address of the first device and the second virtual IP address of the second device.

10. The system of claim 7, wherein the second request has a destination port set to a value to cause the second device to respond to the second request.

11. The system of claim 7, wherein the second request includes at least the portion of the first request as part of the payload of the second request.

12. The system of claim 7, wherein the first device is further configured to redirect data received from the sender device to the tunnel to be transmitted to the receiver device.

13. A system comprising:
   a first device that is intermediary to a client and a server, the first device configured to:
     communicate a discovery request to discover a second device that is intermediary to the client and the server, the discovery request being communicated responsive to receipt of a request of the client to connect to the server, the discovery request including a hash of at least a portion of a payload of the request;
     establish, based at least in part to a response from the second device identifying the same hash, a tunnel between the first device and the second device; and
     communicate via the tunnel network traffic between the client and the server;
   wherein the response from the second device is communicated by the second device responsive to a result of the second device applying a function of the hash to at least a portion of the discovery request.

14. The system of claim 13, wherein the first device has a first connection with the client and the second device has a second connection with the server.

15. The system of claim 14, wherein network traffic of the client is received via the first connection and communicated to the second device via the tunnel so that the second device communicates the network traffic via the second connection to the server.

16. The system of claim 14, wherein the first device is further configured to set a port of the discovery request to a value for which the second device identifies as being the port to respond to the discovery request.

17. The system of claim 14, wherein the first device is configured to establish the tunnel with the second device using a virtual internet protocol (IP) address of the second device.

18. The system of claim 14, wherein the first device is configured to encapsulate network traffic of the client for communications via the tunnel.

\* \* \* \* \*